(12) United States Patent
Khattar

(10) Patent No.: US 12,338,011 B2
(45) Date of Patent: *Jun. 24, 2025

(54) SYSTEM AND METHOD FOR PRECONDITIONING BATTERIES OF UNMANNED AERIAL VEHICLES

(71) Applicant: Zipline International Inc., South San Francisco, CA (US)

(72) Inventor: Puneet Khattar, Bellevue, WA (US)

(73) Assignee: Zipline International Inc., South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,609

(22) Filed: Apr. 10, 2023

(65) Prior Publication Data

US 2023/0242011 A1 Aug. 3, 2023

Related U.S. Application Data

(63) Continuation of application No. 16/731,608, filed on Dec. 31, 2019, now Pat. No. 11,654,794.

(60) Provisional application No. 62/940,201, filed on Nov. 25, 2019.

(51) Int. Cl.
| | |
|---|---|
| *H01M 10/62* | (2014.01) |
| *B60L 50/64* | (2019.01) |
| *B60L 58/24* | (2019.01) |
| *B64D 13/08* | (2006.01) |
| *B64U 50/19* | (2023.01) |
| *B64U 50/39* | (2023.01) |
| *H01M 10/625* | (2014.01) |
| *H01M 10/633* | (2014.01) |
| *H01M 10/6561* | (2014.01) |
| *H01M 50/569* | (2021.01) |
| *B64U 10/25* | (2023.01) |

(52) U.S. Cl.
CPC .............. *B64U 50/39* (2023.01); *B60L 50/64* (2019.02); *B60L 58/24* (2019.02); *B64D 13/08* (2013.01); *B64U 50/19* (2023.01); *H01M 10/625* (2015.04); *H01M 10/633* (2015.04); *H01M 10/6561* (2015.04); *H01M 50/569* (2021.01); *B60L 2200/10* (2013.01); *B64U 10/25* (2023.01); *H01M 2220/20* (2013.01)

(58) Field of Classification Search
CPC ............. H01M 10/625; H01M 10/633; H01M 10/6561; H01M 10/486; H01M 50/569; H01M 2220/20; B60L 58/24; B60L 50/64; B60L 2200/10; B64C 39/024; B64C 2201/021; B64C 2201/042; B64D 13/08; B64U 50/19; B64U 10/25
See application file for complete search history.

(56) References Cited

U.S. PATENT DOCUMENTS

| | | | |
|---|---|---|---|
| 10,960,785 B2 | 3/2021 | Villanueva et al. | |
| 11,230,384 B2 | 1/2022 | Lynn et al. | |
| 11,479,146 B2 | 10/2022 | Villanueva et al. | |
| 11,548,407 B2 | 1/2023 | Villanueva et al. | |
| 11,654,794 B1 * | 5/2023 | Khattar | H01M 10/486 |
| | | | 244/6 |
| 2020/0339010 A1 * | 10/2020 | Villanueva | H01M 10/625 |

OTHER PUBLICATIONS

Provisional U.S. Appl. No. 62/837,504, filed Apr. 23, 2019, 59 pages.

* cited by examiner

*Primary Examiner* — Raymond Alejandro
(74) *Attorney, Agent, or Firm* — Dorsey & Whitney LLP

(57) ABSTRACT

A method of preconditioning a battery for use in an unmanned aerial vehicle unmanned aerial vehicle may include fluidly coupling a fluid channel of a thermal management apparatus to an opening in fluid communication with the battery, determining a predicted temperature change of the battery as a result of the unmanned aerial vehicle traversing a predetermined flight path, determining a target initial temperature for the battery, wherein the target initial temperature is based at least in part on the predicted temperature change and is configured to operate the battery within a preferred temperature range during traversal of the predetermined flight path, selectively actuating a covering of the opening to allow air from the fluid channel of the thermal management apparatus to the battery, and at least one of heating or cooling the battery to the target initial temperature by directing air to the battery.

15 Claims, 11 Drawing Sheets

SYSTEM AND METHOD FOR PRECONDITIONING BATTERIES OF UNMANNED AERIAL VEHICLES

CROSS-REFERENCE TO RELATED APPLICATION(S)

This application is a continuation of U.S. patent application Ser. No. 16/731,608, filed Dec. 31, 2019 and titled "System and Method for Preconditioning Batteries of Unmanned Aerial Vehicles," which issued May 23, 2023 as U.S. Pat. No. 11,654,794 B1, and which claims priority to U.S. Provisional Patent Application No. 62/940,201, filed Nov. 25, 2019 and titled "System and Method for Preconditioning Batteries of Unmanned Aerial Vehicles," the disclosure of each of which is hereby incorporated herein by reference in the entirety and for all purposes.

FIELD

The described embodiments relate generally to unmanned aerial vehicles, and, more particularly, to systems and methods for heating and/or cooling batteries of unmanned aerial vehicles.

BACKGROUND

Unmanned aerial vehicles (UAVs) are increasing in popularity for various applications. For example, UAVs are prevalent among hobbyists and enthusiasts for recreation, and are increasingly considered as viable package delivery vehicles. UAVs take many forms, such as rotorcraft (e.g., helicopters, quadrotors) as well as fixed-wing aircraft. UAVs may also be configured for different degrees of autonomy and may have varying complexity. For example, simple UAVs having only basic avionics may be controllable only by a human-operated remote control. More complex UAVs may be configured with sophisticated avionics and advanced computers, and may be configured for fully autonomous and/or semi-autonomous flight.

Thrust for fixed-wing UAVs may be provided by propellers driven by electric motors. Power for the electric motors may be provided by on-board batteries. Batteries may be rechargeable so that they can be used for multiple flights. In some cases, batteries may be removable from the UAVs so that spent batteries can be replaced with charged batteries. In this way, a UAV need not be grounded during recharging, thus increasing the available flight time for the UAV.

SUMMARY

A battery preconditioning system may include a battery for an unmanned aerial vehicle (UAV), a thermal analysis system configured to predict, for a predetermined flight path of an upcoming flight, a temperature change of the battery as a result of the UAV traversing the predetermined flight path, and determine a target initial temperature for the battery. The target initial temperature is based at least in part on the predicted temperature change and is configured to limit a duration that the battery operates outside an operating temperature window during traversal of the predetermined flight path. The battery preconditioning system may also include a thermal management system configured to receive the target initial temperature from the thermal analysis system and thermally condition the battery by performing at least one of heating or cooling the battery to the determined target initial temperature. Predicting the temperature change of the battery as a result of the UAV traversing the predetermined flight path may include predicting the temperature of the battery at all locations along the predetermined flight path. The battery preconditioning system may further include a computer system, wherein at least some operations of the thermal analysis system and the thermal management system are provided by the computer system.

The battery may include a plurality of cells and an enclosure housing the plurality of cells and defining an air duct in thermal communication with the plurality of cells. The operation of thermally conditioning the battery may include passing a stream of conditioned air through the air duct. The air duct may define an inlet and an outlet, and the enclosure may include a movable inlet door and a movable outlet door, each configured to open during the operation of thermally conditioning the battery and to close during the flight of the UAV. The air duct may define an inlet and an outlet, and the inlet and the outlet may be configured to be sealed closed by a component of the UAV.

The battery may include an enclosure and a plurality of cells positioned within the enclosure. The thermal management system may be positioned at least partially within the enclosure and retained to the battery.

The battery preconditioning system may further include a battery charging system configured to charge the battery and the thermal management system may be configured to, while charging the battery and before heating or cooling the battery to the determined target initial temperature, perform at least one of heating or cooling the battery to a target charging temperature.

A method of preconditioning a battery for use in an unmanned aerial vehicle may include predicting a temperature change of a battery of an unmanned aerial vehicle (UAV) as a result of the UAV traversing a predetermined flight path, determining a target initial temperature for the battery, wherein the target initial temperature is based at least in part on the predicted temperature change and is configured to limit a duration that the battery operates outside an operating temperature window during traversal of the predetermined flight path, at least one of heating or cooling the battery to the determined target initial temperature, installing the battery in a fuselage of the UAV, launching the UAV, and directing the UAV to fly along the predetermined flight path. The method may further include, prior to heating or cooling the battery to the determined target initial temperature, charging the battery and while charging the battery, performing at least one of heating or cooling the battery to a target charging temperature.

The predicted temperature change may be at least partially based on a degradation level of the battery. The degradation level of the battery may be estimated based at least in part on a number of charge cycles to which the battery has been subjected. The predicted temperature change may be at least partially based on a predicted ambient temperature of an external environment of the UAV during at least a portion of the predetermined flight path. The predicted temperature change may be at least partially based on a predicted amount of heat transferred between the battery and an external environment of the UAV during at least a portion of the predetermined flight path.

The operation of at least one of heating or cooling the battery may include passing a stream of air through an enclosure of the battery. The operation of at least one of heating or cooling the battery may include, prior to passing the stream of air through the enclosure of the battery, positioning the battery on a thermal management apparatus and opening at least one door of the battery to fluidly couple an air duct of the thermal management apparatus with an interior of the battery.

An unmanned aerial vehicle may include a fuselage, a wing coupled to the fuselage, and a battery removably coupled to the fuselage. The battery may include a plurality of cells, an enclosure housing the plurality of cells and defining an air duct in thermal communication with the plurality of cells, wherein the air duct defines an inlet and an outlet and is configured to receive a stream of treated air from a thermal management apparatus when the battery is decoupled from the fuselage and coupled to the thermal management apparatus, and the treated air is configured to at least one of heat or cool the plurality of cells to a target temperature.

The battery may include a movable inlet door and a movable outlet door, each configured to be openable when the battery is decoupled from the fuselage and closed when the battery is coupled to the fuselage. The unmanned aerial vehicle may further include door closure features configured to force the movable inlet door and the movable outlet door closed when the battery is coupled to the unmanned aerial vehicle, and the movable inlet door and the movable outlet door are configured to be forced open by a thermal management apparatus when the battery is coupled to the thermal management apparatus. The unmanned aerial vehicle may include sealing components configured to seal the inlet and the outlet closed when the battery is coupled to the fuselage.

A method of preconditioning a battery for use in an unmanned aerial vehicle may include predicting a temperature change of a battery of an unmanned aerial vehicle (UAV) as a result of the UAV traversing a predetermined flight path, and determining a target initial temperature for the battery, wherein the target initial temperature is based at least in part on the predicted temperature change and is configured to limit a duration that the battery operates outside an operating temperature window during traversal of the predetermined flight path. The method may further include selecting, from a set of candidate batteries, a candidate battery having an actual temperature that is closest to the target initial temperature, at least one of heating or cooling the selected candidate battery from the actual temperature to the determined target initial temperature, installing the selected candidate battery in a fuselage of the UAV, launching the UAV, and directing the UAV to fly along the predetermined flight path. The set of candidate batteries may include a first subset of candidate batteries having a first actual temperature and a second subset of candidate batteries having a second actual temperature different from the first actual temperature.

A method of preconditioning a battery for use in an unmanned aerial vehicle unmanned aerial vehicle may include fluidly coupling a fluid channel of a thermal management apparatus to an opening in fluid communication with the battery, determining a predicted temperature change of the battery as a result of the unmanned aerial vehicle traversing a predetermined flight path, determining a target initial temperature for the battery, wherein the target initial temperature is based at least in part on the predicted temperature change and is configured to operate the battery within a preferred temperature range during traversal of the predetermined flight path, selectively actuating a covering of the opening to allow air from the fluid channel of the thermal management apparatus to the battery, and at least one of heating or cooling the battery to the target initial temperature by directing air to the battery.

A method of conditioning a battery for use in an unmanned aerial vehicle unmanned aerial vehicle may include determining a target battery temperature for the battery of the unmanned aerial vehicle based on flight conditions for a planned flight path of the unmanned aerial vehicle, wherein the target battery temperature is configured to limit a duration that the battery operates above or below a threshold temperature during traversal of the planned flight path, fluidly coupling a channel of the thermal management apparatus to an opening in fluid communication with one or more cells of the battery to perform at least one of heating or cooling the battery to the target charging temperature. The method may also include at least one of heating or cooling the battery to the target battery temperature, wherein the heating or cooling is based on a predicted temperature change of the battery as a result of the unmanned aerial vehicle traversing the planned flight path, and wherein the operation of at least one of heating or cooling the battery comprises passing a stream of air from the channel to the battery, and clearing the unmanned aerial vehicle for launch when the battery is at the target battery temperature.

An unmanned aerial vehicle battery conditioning system may include the unmanned aerial vehicle including a fuselage, and a battery removably coupled to the fuselage, the battery including a plurality of cells, and an enclosure housing the plurality of cells, an inlet and an outlet on an external surface of the unmanned aerial vehicle, the inlet and the outlet selectively covered by one or more doors, and an air duct extending from the inlet and outlet to the plurality of cells. The system may also include a thermal management apparatus including a thermal analysis system configured to determine a target temperature for the battery, wherein the target temperature is based at least in part a predicted temperature change of the battery as a result of the unmanned aerial vehicle traversing a predetermined flight path, and a thermal management system fluidly coupled to the inlet and the outlet to provide treated air configured to at least one of heat or cool the battery to the target temperature.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
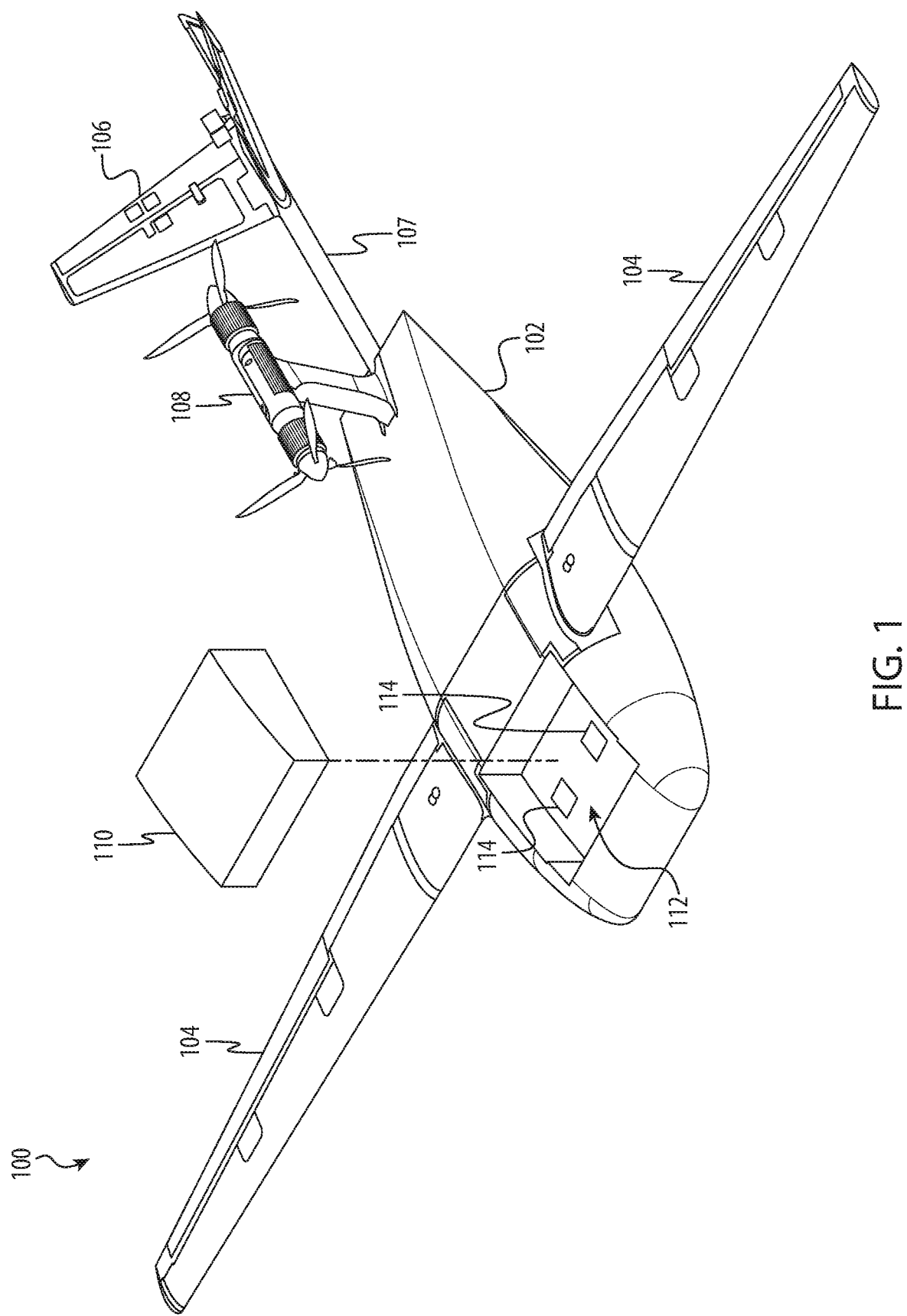
FIG. 1 depicts an example unmanned aerial vehicle (UAV)

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The concepts set forth herein are generally directed to electric vehicles with removable, rechargeable batteries that provide electrical power for the motors of the electrical vehicles. The instant application uses unmanned aerial vehicles (UAVs) for illustrative purposes, though the concepts described herein are applicable to other types of electric vehicles as well, such as cars, trucks, boats, motorcycles, scooters, industrial equipment, robots, etc.

Rechargeable batteries, such as those used for UAVs, electric cars, and the like, do not last forever, however, and their useful life and their efficiency may degrade with time and use. Battery parameters such as efficiency and longevity may depend on various factors. For example, battery efficiency during discharge (e.g., when the battery is powering a load such as a propulsion motor) may depend in part on the temperature of the battery during discharge. Further, battery longevity, or the number of times it can be effectively recharged and used for a particular application, may be affected by the amount of time that a battery remains above a threshold temperature, in addition to other factors such as age of the battery, a number of charge/discharge cycles the battery has undergone, and the like.

In applications where batteries are frequently subjected to recharge cycles, and in which batteries are both a critical component in the application as well as a significant expense, maximizing battery efficiency and longevity may be highly advantageous. For example, an Unmanned Aerial System (UAS) may employ multiple UAVs and multiple swappable batteries to power the UAVs. Careful thermal management of the batteries may help increase the useful life of the batteries. For example, by minimizing the amount of time that a battery spends above a threshold temperature, the life of the battery may be maximized, thus increasing UAV range and decreasing costs associated with disposing of old batteries and purchasing new ones.

Conventionally, batteries and/or battery powered devices may include thermal protection for batteries. For example, devices may be shut down to protect the battery if the battery temperature is too high. This type of reactive thermal management has several drawbacks. For example, in the context of UAVs (or other electric vehicles), it may be unsafe to allow a battery to simply shut down if an over-temperature condition is detected while the UAV is flying, as it may result in a crash. In the context of the UAS described herein, however, more proactive thermal management may be employed to help increase battery life and provide greater battery efficiency and effectiveness.

In particular, the instant application describes systems and methods whereby batteries for UAVs may be thermally preconditioned before they are placed in UAVs and used to power the UAV for a mission. More specifically, the batteries may be heated or cooled to a target initial temperature that is based on the exact, expected, approximate, or predicted flight path for the mission, as well as the current or predicted weather and/or thermal conditions expected for the flight path. For example, the UAS may predefine flight paths for UAV missions. A flight path may, for example, correspond to a round-trip flight to a particular location at a particular time to deliver a package or other payload, and may define the position of the UAV in three-dimensional space for the duration of the mission. Using the known flight path, as well as other factors, such as the predicted air temperature along the flight path, a thermal analysis system of the UAS may predict how the temperature of the battery will change as a result of the mission. Notably, the UAS may determine a specific predicted temperature change of the battery as a result of the mission, and not merely make a general prediction or guess that the temperature of the battery may change.

Based on the predicted temperature change, the thermal analysis system may determine a target initial temperature for the battery for that particular mission, and cause the battery to be heated or cooled to that target initial temperature. The target initial temperature may be selected to achieve various possible outcomes. For example, the target initial temperature may be selected to minimize the amount of time that a battery will spend above an upper threshold temperature during the flight. As another example, the target initial temperature may be selected to maximize the amount of time that a battery will spend above a lower threshold temperature during the flight. As another example, the target initial temperature may be selected to maximize the amount of time that a battery will spend within a temperature range during the flight. By predicting the temperature change of a battery due to flying along a given flight path, and thermally preconditioning the battery based on the predicted temperature change, the batteries may spend more time operating within an optimal range of conditions and/or less time operating in conditions that are damaging to the batteries, thus increasing their life span and decreasing costs of running the UAS. Further, because the entire flight path is known prior to the mission, and because predicted weather and ambient temperature are also considered, the selection or determination of the target initial temperature may be more effective in producing optimal battery temperatures during flight than other methods of battery preconditioning.

FIG. 1 depicts an example UAV 100. The UAV 100 may include a fuselage 102, a wing structure 104, a tail section 106, and a motor module 108. The fuselage 102 may be formed from a substantially rigid load bearing frame and a polymer foam body that at least partially encapsulates the frame, and may have a shape that provides lift to the UAV during flight, in addition to the wing structure 104. (As used herein, flight may refer to sustained flight operations as well as takeoff and landing operations.) The polymer foam of the body may have low thermal conductivity, such that components of the UAV within the fuselage 102 may be insulated from the air outside the fuselage 102 during flight. Other methods of insulation may also be used to achieve the same result.

The wing structure 104 may provide lift to the UAV during flight, and may be releasably coupled to the fuselage 102. The wing structure 104 may be part of a single, integrated structure that includes a first wing segment on one side of the fuselage 102, a second wing segment on an opposite side of the fuselage, and a central section between and joining the first and second segments. The wing structure 104 may include movable flight control surfaces, which may be or may resemble flaps. The flight control surfaces may be configured to move to control and/or change the attitude of the UAV in flight (e.g., to change the pitch and/or roll of the UAV 100). Other configurations of the wing structure 104 and how it couples to the fuselage are also contemplated.

The tail section 106 may also include movable flight control surfaces that may move to control the attitude of the UAV 100 during flight. The tail section 106 may be attached to the fuselage 102 via a tail support 107 that may be attached to an internal load bearing frame of the fuselage 102. The tail support 107 may have a hollow interior channel that carries wires for electrically connecting the actuators and/or other tail-mounted electronics to the avionics of the UAV 100.

The motor module 108 may include one or more motors for propelling the UAV 100 during flight. As shown, the motor module 108 includes two propellers, which are configured to act in concert to propel the UAV 100. In other cases, more or fewer propellers may be used. The motor module 108 (and/or the motors included in the motor module 108) may receive electrical power from the battery 110 to power the motors and provide propulsion to the UAV 100.

The UAV 100 may also include a battery 110 that is attached to the fuselage 102. The battery 110 may provide power for the UAV 100. For example, the battery 110 may provide electrical power for the avionics and optionally any electric motors and/or other components on the UAV 100. The battery 110 may be removable from the fuselage 102 to facilitate easy swapping. In some cases, the battery 110 may be positioned in a battery receptacle 112 defined in the fuselage 102. The battery 110 may include multiple individual battery cells, which may be connected together in series, parallel, series-parallel, or any other suitable configuration. The battery 110 may include a housing with cells contained therein.

The battery 110 and the UAV 100 may include physical and electrical coupling mechanisms to retain the battery 110 to the fuselage 102 and to electrically couple the battery 110 to electrical components of the UAV 100. In one embodiment the battery 110 may define exterior surfaces of the UAV 100. These exterior surfaces may provide various functionality, including acting as a heat exchanger (e.g., a heat sink) for batteries inside the battery 110. In another embodiment, the battery 110 may be coupled to the UAV 100 and then enclosed by a cover (either a separate shell or a portion of the fuselage 102) that provides aerodynamic shape and insulation. In some cases the battery 110 may be configured to be heated and/or cooled in-flight. In some cases, the UAV 100 includes supply and/or exhaust ducts 114 that direct air over and/or through the battery 110. Supply and exhaust ducts, as well as other techniques for heating and/or cooling a battery in flight or on the ground, are described herein.

The battery 110 may be removably attached to the fuselage 102 via a releasable coupling. More particularly, the battery 110 may be removed from the fuselage 102 for charging, conditioning, and/or maintenance. The batteries for the UAVs may be standardized so that batteries can be swapped between and among different UAVs.

The UAV 100 shown and described with respect to FIG. 1 is merely one example UAV that may be used in conjunction with the battery preconditioning systems and techniques described herein. Indeed, the disclosed battery preconditioning concepts may be used with other types and configurations UAVs (including, but not limited to, fixed-wing aircraft and rotorcraft) or other battery-powered vehicles.

Battery related components of the UAS, such as battery chargers, battery monitoring equipment, battery thermal conditioners, and the batteries themselves, are managed by the battery management system 200. Apart from charging, thermally conditioning, and monitoring batteries, the battery management system 200 selects batteries for installation in UAVs based on the energy requirements and the thermal requirements of a given mission or flight path. The battery management system 200 determines target initial temperatures for batteries and either selects batteries that are already at the determined target initial temperature or causes selected batteries to be thermally preconditioned to the determined target initial temperatures prior to being used for the missions.

Figure 2:
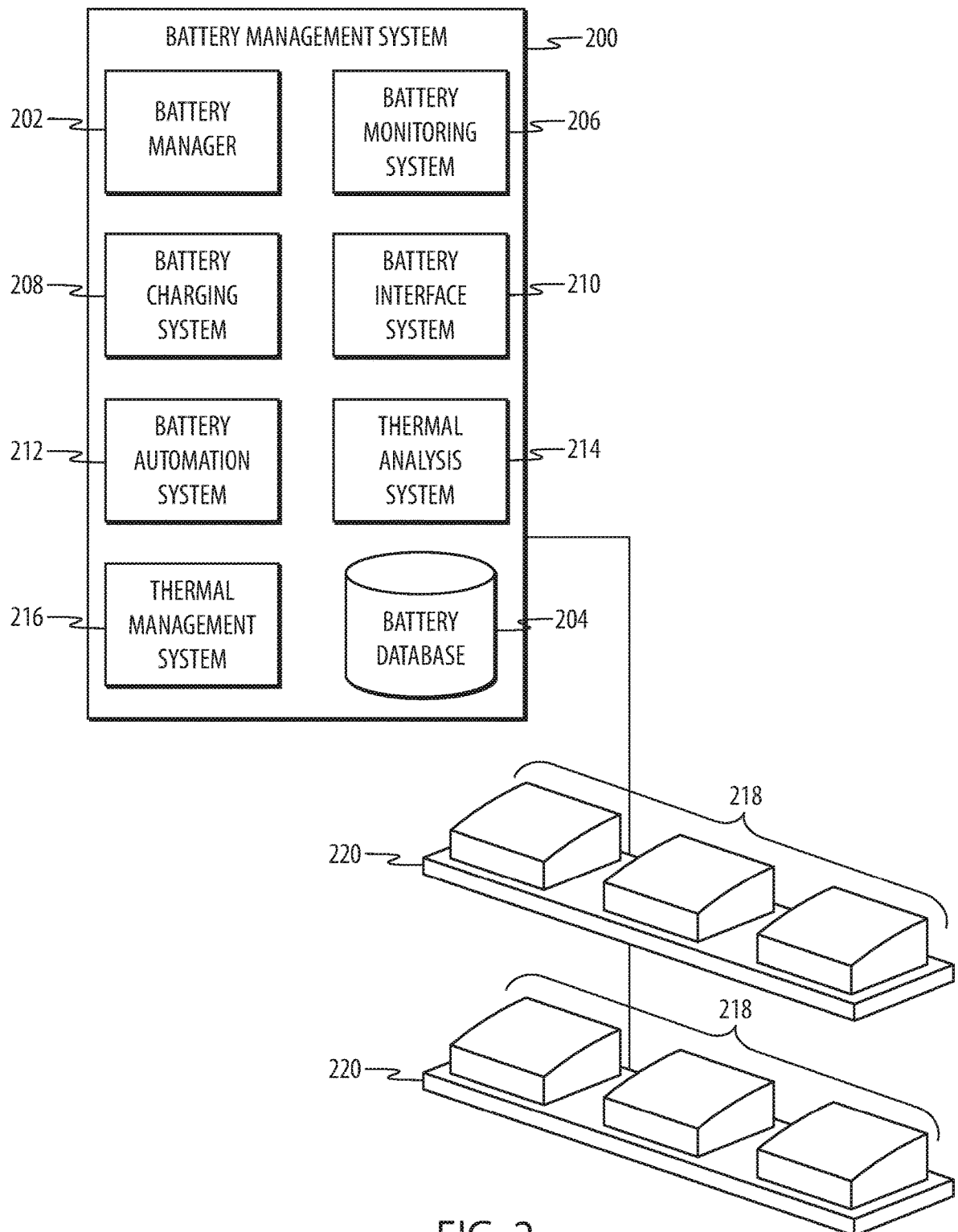
FIG. 2 depicts a battery management system.

FIG. 2 illustrates the components of a battery management system 200 according to one example embodiment. In this embodiment, the battery management system 200 comprises a battery manager 202, a battery monitoring system 206, a battery database 204, a battery charging system 208, a battery interface system 210, a battery automation system 212, a thermal analysis system 214, a thermal management system 216, and a battery inventory 218.

The battery inventory 218 comprises a number of batteries (such as the battery 110, FIG. 1) that can be used to power electric vehicles. This disclosure has primarily discussed electric UAVs, however the batteries could be used to power other electric vehicles, such as, for example, electric cars, electric scooters, industrial equipment, robots, etc. The batteries in the battery inventory 218 may be coupled to or include battery sensors that facilitate monitoring of the batteries by the battery monitoring system 206. The battery sensors may be part of the batteries themselves, or they may be separate instruments that are part of the battery monitoring system 206 that can be attached to and detached from the batteries. The battery sensors may include thermal sensors (e.g., temperature sensors, thermocouples, etc.), power sensors, voltage sensors, or the like.

The battery monitoring system 206 uses the battery sensors to detect properties of each battery (and optionally individual battery cells in the batteries) in the battery inventory 218. Detecting properties of a battery may include sensing, calculating, estimating, or otherwise determining values, properties, or other characteristics of a battery. The detected properties may be reported as, or may be used to generate, battery information for each battery. Battery information may include the voltage and output current at the battery's electrodes, the amount of electrical energy stored in the battery (sometimes referred to herein as "charge level"), the storage capacity of the battery (sometimes referred to herein as "capacity" or "storage capacity"), the temperature of the battery, the number of charge and discharge cycles the battery has undergone, and the rate of change in voltage and output current when the battery is charged or discharged. The battery information may also include data about the chemical and physical state of the battery's cells, electrodes, and electrolytes, or other components. As used herein, both the amount of electrical energy stored in a battery and the storage capacity of the battery may be measured with the same unit (e.g., Watt-hours or Amp-hours). However, for a given battery, the values of these properties may be different. For example, a battery with a capacity of 100 Watt-hours may be charged to 50% of its capacity, and thus have a charge level of 50 Watt-hours.

The battery information can be used to determine many aspects of a battery's condition. For example, the battery information can be used to determine the energy storage capacity for each battery, the useful remaining operational life for each battery, the charge level of each battery, the predicted capacity degradation for each battery (e.g., the reduction in the energy storage capacity of the battery as compared to an ideal or a previously measured energy storage capacity), the likelihood of failure of each battery, etc. These determinations can be made by the battery manager 202, or by other modules in the UAS.

At least some of the battery information, which the battery monitoring system 206 gathers from the batteries, may be stored into a battery database 204. The battery database 204 is a device that provides means for storing information durably. In one embodiment, the battery database 204 may be a computer with a hard drive or a solid state drive (or some other means for storage) running a software database system such as MYSQL, POSTGRES SQL, MONGODB, etc. In another embodiment the battery database 204 is a software program running on a cloud service, such as AMAZON WEB SERVICES, GOOGLE CLOUD, etc. In another embodiment the battery database 204 is part of the battery manager 202, or executes on the same computer hardware as the battery manager 202.

The battery charging system 208 may comprise a single charging device that can be coupled to one or more batteries in the battery inventory 218, or it may comprise several independent devices that can charge many batteries. In one embodiment, the battery charging system 208 comprises, communicates with, and/or controls a rack charger 220 that can be coupled to many batteries simultaneously. The battery charging system 208 receives instructions from the battery manager 202 identifying target charge specifications for batteries (either individually or collectively), and charges the batteries to achieve the target charge specifications. The rack charger 220 may electrically couple to the batteries (e.g., via battery terminals on the batteries and complementary connectors on the rack charger 220) to charge and/or discharge the batteries. The rack charger 220 may also communicatively couple to the batteries (e.g., via communications connectors on the batteries and the rack) to facilitate communications between the batteries (and onboard sensors, computers, and the like) and the battery management system 200. The rack charger 220 may also include thermal systems, such as air conditioning systems, fans, ducting, and other systems for heating and/or cooling the batteries during various operations and in anticipation of missions. Additional details of the thermal systems are described herein.

The battery monitoring system 206 may report one or more properties or characteristics of the batteries to the battery manager 202 during charging to enable the battery manager 202 to issue charging instructions to the battery charging system 208 to stop charging, increase or decrease the rate of charging, change the target charge specifications for the batteries, or the like. The battery manager 202 may issue charging instructions in several different ways. In one embodiment the charge specification includes a target output voltage for each battery, and the battery charging system 208 will apply current to the battery at a particular input voltage until the batteries show the target output voltage at their electrodes. In another embodiment the charge specification includes both a target output voltage and a target output current. In this embodiment the batteries are charged until they reach the target output voltage and the target output current, and then the charging is stopped. In another embodiment the charge specification includes a target power rating (e.g., a target Watt-hour) or target current rating (e.g., Amp-hour), and the batteries are charged until the target power or current rating is reached. In another embodiment, the charge specification includes a target reading from a charge sensor of the battery. The charge sensor is a sensor (and/or associated circuitry or other components) that is incorporated into the battery and which indicates a level of charge of the battery (e.g., Watt-hours, Amp-hours, etc.). The battery charging system 208 may read an output from the charge sensor via any appropriate technique, such as visual analysis of a display, detection of an analog signal that represents or indicates the charge level of the battery, or receiving a digital signal that includes a charge level of the battery.

In one embodiment, the battery charging system 208 receives a charge specification for one or more selected batteries and charges the batteries based on the charge specification. The charge specification may instruct the battery charging system 208 to charge a battery less than its full energy storage capacity in order to minimize the capacity degradation of the battery as a result of unnecessary charging.

In one embodiment, the battery charging system 208 has a safety mechanism that automatically halts the electricity flow into a battery if it detects that the battery temperature, voltage, or current is outside of a safety range for these properties, or if the charge specification would exceed the storage capacity of the battery.

The battery manager 202 is a hardware or software module that coordinates the functioning of the other components of the battery management system 200. In one embodiment, the battery manager 202 is a software program running on hardware that has network access to the other components of the battery management system 200. In another embodiment, the battery manager 202 is a software program that executes on the same computer hardware as one or more other components of the battery management system 200.

The battery manager 202 receives battery information from the battery monitoring system 206 and the battery database 204, as well as requests from other components or systems of the UAS, and determines specific instructions for the other components of the battery management system 200. For example, the battery information received from the battery monitoring system 206 may include information indicating that the charge in a specific battery is insufficient for a particular UAV mission, and on the basis of this information the battery manager 202 may send instructions to the battery charging system 208 to charge that specific battery. If the specific battery is not already coupled to the battery charging system 208, the battery manager 202 may also send instructions to a battery automation system 212 or to a human operator to connect the specific battery to the battery charging system 208.

The battery manager 202 may receive mission energy requirements, describing an amount of energy required by an electric vehicle (e.g., a UAV) to complete a mission, and the battery manager 202 may issue instructions (e.g., battery selection instructions, charge specifications, etc.) on the basis of the mission energy requirements. The mission energy requirements may specify a charge level needed by an electric vehicle to complete a mission (e.g., to traverse or fly along a predetermined flight path). For example, a mission energy requirement may specify the energy required by a UAV 100 to fly to a destination site along a particular route with a given wind condition, drop a payload, and return to a launch site. The mission energy requirement may be specified in a standard unit such as Watt-hours, Amp-hours, or by some other metric.

The mission energy requirement may specify a power requirement in addition to a charge level. In particular, whereas the charge level relates to a total amount of electrical energy that the battery can deliver from a given charge, a power requirement may define a particular amount of power that may be required by the electric vehicle for part of its mission. For example, if the UAV 100 must fly over a windy mountain, it may need an increased amount of power delivered to its motors during its ascent as compared to the power requirement during level flight. Thus, any battery selected for such a mission will need to be able to provide the boost of power needed for the ascent, in addition to providing the overall amount of energy required for the rest of the mission. By taking the power requirement of a mission into account in addition to overall energy requirements, the selection and charging of batteries can be tailored to individual missions and flight paths. For example, a longer mission with lower maximum power requirements (e.g., characterized by level flight with low winds) may be able to use a battery with a larger capacity but a lower maximum power output, whereas a shorter mission with higher maximum power requirements (e.g., characterized by frequent altitude changes and/or windy conditions) may be able to use a battery with a lower capacity (or a battery that is charged to a lower charge level) but a higher maximum power output. In the foregoing discussion, the power requirement may be replaced and/or supplemented with an electrical current requirement. Thus, a battery may be selected for its ability to deliver a certain maximum electrical current to the motors of the UAV 100.

In one embodiment, the battery manager 202 instructs the battery charging system 208 to charge a battery based on the mission energy requirements and the existing charge in the battery. For example, the battery manager 202 may instruct the battery charging system 208 to charge a selected battery to a specific level based on the mission energy requirements of a particular mission (e.g., a predetermined flight path). The battery manager 202 may also instruct the thermal management system 216 to thermally condition the selected battery by heating or cooling the selected battery to a target initial temperature, as described herein. As used herein, the term "thermally conditioning" or "thermal conditioning" may include heating and/or cooling the battery.

In one embodiment the battery manager 202 uses the battery information and the mission energy requirements to select one or more batteries that can efficiently provide the energy required by an electric vehicle for a particular mission, while at the same time balancing other concerns, such as minimization of battery degradation, maximization of battery life, etc.

The battery manager 202 selects a battery or batteries for a particular electric vehicle's mission based on several possible criteria and methodologies. In one embodiment, the battery manager 202 selects batteries by determining a battery or batteries from the battery inventory 218 that will have adequate capacity to satisfy the mission energy requirements.

The capacity of the batteries can be determined using the battery information from the battery monitoring system 206 and the battery database 204. In some cases, the exact capacity of a battery is not known (or is not readily determinable), but an approximate capacity can be determined from various data. For example, in one embodiment, the present capacity of a battery is approximated by using an initial capacity measurement (given by a manufacturer or measured by the battery monitoring system 206 via a full charge and discharge of the battery), and reducing that capacity measurement based on the number of charge/discharge cycles of the battery that have occurred since the measurement was taken, to obtain an approximate present capacity for the battery. The amount that the initial capacity measurement is reduced per charge/discharge cycle can be based on the amount of capacity reduction that was observed historically in similar batteries. In addition to the number of charge/discharge cycles, the approximated capacity for a battery can also be adjusted based on historical performance data for the battery and similar batteries, the temperature at which the battery was charged/discharged, etc.

Once a particular mission has been selected, the thermal analysis system 214 may predict, for a predetermined flight path of an upcoming mission, a temperature change of the battery as a result of the UAV traversing the predetermined flight path. The temperature change of the battery may be predicted based at least in part on battery information of the selected battery. For example, the predicted temperature change may account for the age of the battery. More particularly, some types of batteries have a greater temperature rise as they get older and have gone through more charge cycles. Accordingly, the predicted temperature change of a battery may take into account the number of charge cycles the battery has undergone, the overall age of the battery, or the like. The thermal analysis system 214 may also determine a target initial temperature for the battery based at least in part on the predicted temperature change. The target initial temperature may be determined so as to limit a duration that the battery operates outside an operating temperature window during traversal of the predetermined flight path. In some cases, the target initial temperature may be determined so as to prevent (at least theoretically) the battery from operating outside the operating temperature window during traversal of the predetermined flight path. Additional details of the target initial temperature determination are provided herein. As used herein, battery information may refer to parameters, data, or other information about a specific battery, including but not limited to the battery age, actual temperature, number of charge/discharge cycles, maximum/minimum achieved temperature, battery chemistry, number or type of battery cells, battery insulation rating or type, rated capacity, and actual capacity.

Once the thermal analysis system 214 predicts the temperature change and determines a target initial temperature for the battery, it may communicate with the thermal management system 216 to cause the selected battery to be thermally conditioned to the target initial temperature. The thermal management system 216 may include or be operatively connected with thermal management apparatuses or systems for cooling and/or heating the selected battery. For example, the rack charger 220 may include fluid channels or ducting that can pass air or other fluids through, over, or around the batteries to heat and/or cool the batteries. The thermal management system 216 may also include or control air conditioners, heaters, Peltier devices, heating coils, fans, and/or other components that can heat and/or cool the batteries. The thermal management system 216 may include or control the heating and/or cooling operations of the various thermal management apparatuses to cause selected batteries to be heated and/or cooled to their target initial temperatures. Example thermal management apparatuses and systems are described in greater detail herein.

The thermal analysis system 214 and the thermal management system 216 are shown as separate systems or modules in FIG. 2, though they need not be physically, logically, or programmatically separated in this particular manner. For example, the thermal analysis system 214 and the thermal management system 216 may both be executed by the same computer system, or they may be executed by different computer systems. Further, functions and operations that are described in relation to one of the systems may be executed by multiple different computers. Thus, though they are described separately in the instant discussion, and though certain functions are described as being performed by certain systems, the functions described here may be performed by different combinations of systems or by different systems entirely. In some cases, at least some of the functions of the thermal management system 216 may be executed by computer systems that are onboard the batteries. For example, a battery-mounted processor may receive a target initial temperature specification from the thermal analysis system 214 and cause thermal management apparatuses (which may be onboard the battery, such as a heating coil coupled to the battery cells, or external to the battery, such as an air conditioner on a rack charger 220) to thermally condition the battery to the target initial temperature.

Once a battery or batteries are selected, charged, and thermally conditioned, the battery manager 202 may send a signal to the battery interface system 210 and the battery automation system 212, indicating the selected batteries. The latter modules can take further action, as described below, based on the battery selection.

The battery interface system 210 provides a human-readable interface that can indicate the selected batteries in the battery inventory 218 to a human operator, as well as display data related to the batteries in the battery inventory 218 (e.g., battery charge state, battery temperature, number of charge/discharge cycles, etc.). The operator can perform various tasks related to the selected batteries based on the indications. For example, the operator can be informed via a human-readable indicator operated by the battery interface system 210 that a particular battery should be installed on a particular UAV for a mission.

The battery automation system 212 is a system that helps to reduce the amount of manual labor required of a human operator. The battery automation system 212 includes one or more devices that perform at least some of the tasks related to batteries in the battery inventory 218. For example, the battery automation system 212 may automatically perform one or more of the following battery related tasks: installing and removing batteries from an electric vehicle; coupling and uncoupling batteries from the battery charging system 208; and coupling and uncoupling batteries from the battery monitoring system 206. In one embodiment the battery automation system 212 comprises a robotic arm that performs automation tasks. In another embodiment, the battery automation system 212 and the battery charging system 208 are merged into a single device or system that can both charge batteries and install the charged batteries onto a UAV.

After the battery manager 202 selects one or more batteries for an electric vehicle's mission, the battery manager 202 may issue additional instructions to other modules in the battery management system 200 to prepare the batteries for the mission. For example, the battery manager 202 may instruct the battery charging system 208 to charge one or more of the selected batteries if their charge level is not sufficient to meet the mission energy requirement. The battery manager 202 may also instruct the thermal analysis system 214 to determine a target initial temperature for the battery based on the demands of the mission (and optionally weather conditions, as described herein), and optionally instruct the thermal management system 216 to heat or cool the battery to the determined target initial temperature. The battery manager 202 may issue instructions to the battery interface system 210 (to inform an operator) or the battery automation system 212, to couple specific selected batteries to the battery charging system 208, or to install specific selected batteries to an electric vehicle.

The battery manager 202 may also improve the battery selection process by gathering information before and after electric vehicle missions. For example, the battery manager 202 may cause the battery monitoring system 206 to take pre-mission readings of battery properties for selected batteries, such as the charge level, temperature, voltage at the electrodes, electrical current output, etc. These pre-mission properties may be stored in the battery database 204. The selected batteries may then be installed into an electric vehicle for its mission (e.g. they may be installed in a UAV for a flight). When the electric vehicle returns after its mission, the battery manager 202 may cause the battery monitoring system 206 to measure post-mission properties (for the same battery properties) of the batteries in the electric vehicle. The battery manager 202 may also receive, from a battery or a UAV, battery data that was logged during flight, such as discharge rates, battery temperatures, ambient air temperatures, and the like. The pre-mission properties, post-mission properties, and logged in-mission properties may be stored in association with the battery and may be used to update or modify battery information (e.g., charge cycles, maximum temperature reached, minimum temperature reached, amount of time above and/or below threshold temperatures, and the like). These properties may also be used to update and/or modify models that are used by the battery management system 200, such as models for predicting capacity degradation, predicting temperature changes of batteries as a result of traversing flight paths, and the like.

Figure 3:
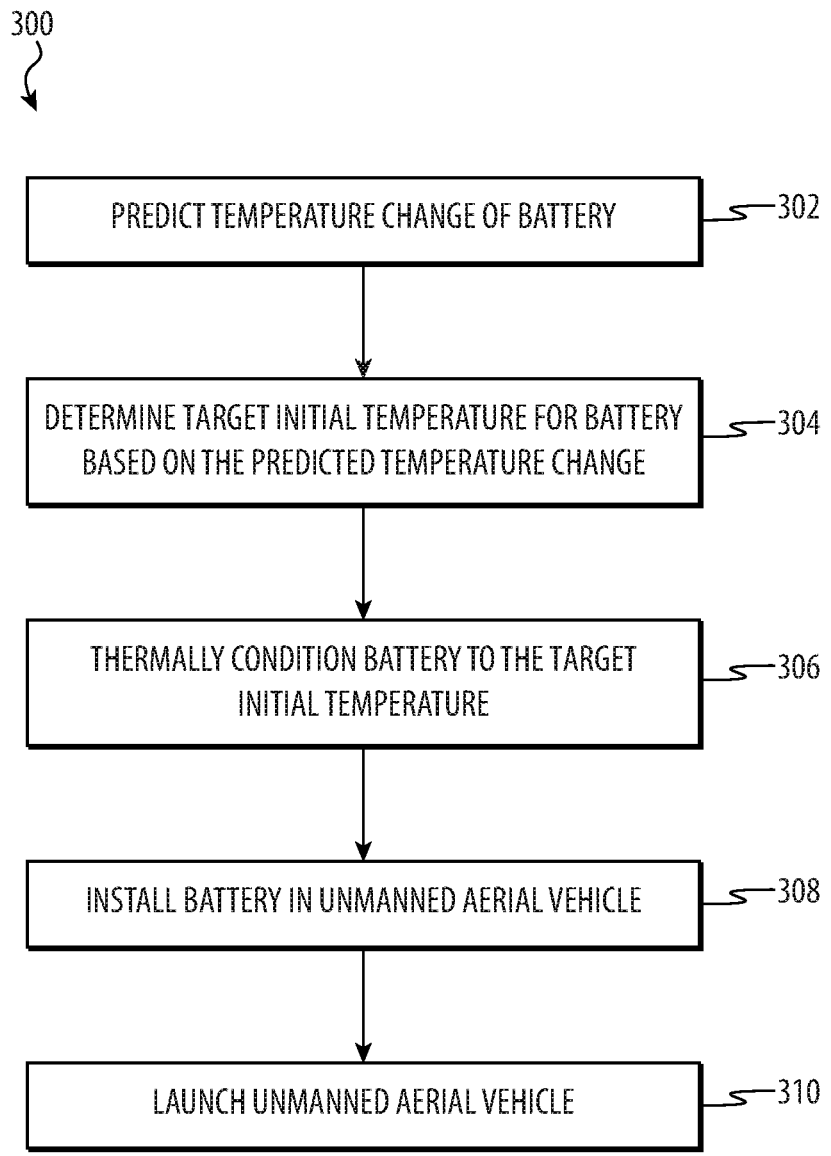
FIG. 3 depicts an example method of thermally preconditioning a battery.

FIG. 3 is a flow chart of an example method 300 of thermally preconditioning a battery for use in a UAV. The method 300 may be performed by any suitable devices and/or systems, such as the thermal analysis system 214 and the thermal management system 216 in FIG. 2 (which may be and/or include computer systems, thermal management apparatuses, and the like).

At operation 302, a temperature change of a battery of a UAV as a result of the UAV traversing a predetermined flight path is predicted. Predicting the temperature change may include predicting the complete temperature profile of the battery along the predetermined flight path (e.g., temperature values of the battery along the predetermined flight path). In this way, a complete profile of the battery's temperature as it traverses the predetermined flight path can be known and analyzed (prior to launch) and used to determine a target initial battery temperature, as described herein. FIGS. 4A-4D illustrate example temperature profiles of a battery along a predetermined flight path.

Predicting the temperature change of the battery is facilitated by the UAS having predetermined the entire flight path of the UAV for a given mission. For example, the position, velocity, acceleration, direction of travel, and other details of the flight plan are established for a given mission prior to the UAV being launched. Accordingly, the UAS, and more particularly the thermal analysis system 214, can determine the expected power output required from the battery at any point along the flight path. For example, if the flight path includes a climb over a mountain range, the amount of power required by the UAV to make that maneuver, and by extension the expected power required from the battery to make that maneuver, may be known, with some degree of confidence. The actual power required for a specific flight may vary from the expected power requirement of the flight plan due to variable factors such as wind, but such variation is generally expected to even out over many flights (since some flights will take less than the expected power requirements while others take more).

The thermal analysis system 214 may base the determination of the temperature change of the battery at least in part on the degradation level of the battery. In particular, for a given power output, older and more degraded batteries may increase in temperature more than newer or less degraded batteries. Accordingly, the thermal analysis system 214 may account for the age and/or degradation of the batteries to more accurately predict the temperature change of the selected battery for the predetermined flight path. In some cases, a relationship between temperature change and power output is known for the selected battery (e.g., based on data from previous flights). The relationship between temperature change of a battery resulting from its power output may be referred to herein for simplicity as a ΔT/power ratio. The ΔT/power ratio may change as a battery degradation level increases. In some cases, the degradation level, and thus the ΔT/power ratio, is based at least in part on a number of charge cycles the battery has undergone, the age of the battery, or the like.

Where the ΔT/power ratio for a given battery is known (e.g., measured and/or calculated using data from actual flights), the thermal analysis system 214 may use the known mathematical relationship to predict the temperature rise of that battery when traversing the predetermined flight path. In other cases, a ΔT/power ratio is estimated for the selected battery based on that battery's age, degradation level, etc. For example, the thermal analysis system 214 may use a type-specific or generic scale that associates age and/or degradation level of batteries of a specific type or generically with ΔT/power ratios. The thermal analysis system 214 may thus estimate the temperature rise of a battery along the entire flight path, while taking into account the degradation level of the battery, even without knowing an actual (e.g., measured) ΔT/power ratio for that individual battery.

The thermal analysis system 214 may also account for other factors when determining the temperature change of the battery as a result of the UAV traversing a predetermined flight path. For example, the thermal analysis system 214 may determine the predicted temperature change based at least in part on a predicted ambient temperature of an external environment of the UAV during at least a portion of the predetermined flight path. In particular, because a plan for the entire flight path is known prior to the start of the mission, the location of the UAV in three-dimensional space at all times during the mission is known. Accordingly, using weather forecasts, the predicted ambient temperature around the UAV at all times during the mission can be determined. This detailed ambient temperature data, along with the temperature rise of the battery due to power output, allows the thermal analysis system 214 to predict the temperature change of the battery to a greater degree of accuracy, as the prediction accounts for any heat transfer between the battery and the air around the UAV during flight.

When predicting the temperature change of the battery, the thermal analysis system 214 may use one or more heat transfer coefficients to define the heat transfer rate between the battery and the outside air. The heat transfer coefficients may reflect factors such as the insulation effect of the UAV and/or the battery pack, as well as the speed of the air along heat transfer surfaces of the battery pack (e.g., along surfaces of the battery pack that define external surfaces of the UAV). Thus, for example, if the flight path has the UAV travelling at high speeds through a segment with very cold air, the predicted temperature values of the battery along that segment may reflect the predicted heat loss to the surrounding air (e.g., resulting in lower temperature values than would be predicted if air temperature were not taken into consideration). Similarly, if the flight path has the UAV travelling through a segment with very hot air, the predicted temperature values of the battery along that segment may reflect the predicted heat gain from the surrounding air (e.g., resulting in higher temperature values than would be predicted if air temperature were not accounted for).

By accounting for factors such as battery degradation, ambient air temperature, insulation, and air speed, the thermal analysis system 214 can predict the temperature change of the battery along the flight path with a high degree of accuracy. For example, instead of simply determining that a temperature rise of indeterminate value is likely to occur during a mission or trip, the thermal analysis system 214 may predict actual battery temperature values along the flight path, based on numerous measured and predicted parameters (e.g., actual or predicted ΔT/power ratios, predicted air temperatures, expected air speeds, actual or predicted heat transfer coefficients, etc.). This data may then be used to determine a suitable target initial temperature for the battery, as discussed herein.

At operation 304, the thermal analysis system 214 determines a target initial temperature for the battery. The target initial temperature may be based at least in part on the predicted temperature change (from operation 302) and is configured to limit a duration that the battery operates outside an operating temperature window during traversal of the predetermined flight path. More particularly, the target initial temperature may be selected so that the temperature profile of the battery during the mission is optimized. For example, as described in greater detail with respect to FIGS. 4A-4D, the target initial temperature may be determined so that the maximum temperature of the battery during the mission does not exceed a threshold temperature, or to minimize the amount of time that a battery is above a threshold value, or to achieve other possible target scenarios.

At operation 306, the battery is thermally preconditioned by performing at least one of heating or cooling the battery to the target initial temperature. For example, the thermal analysis system 214 may provide the target initial temperature to a thermal management system 216, which in turn initiates heating and/or cooling operations to bring the battery to the target initial temperature.

Thermally preconditioning the battery may be achieved using various techniques. For example, heating the battery may be accomplished by providing power to a heating coil or other heating apparatus that is thermally coupled with the battery (and in some cases physically resides in the battery module). In some cases, heating and/or cooling may be accomplished by passing a stream of fluid (e.g., ambient, heated, or cooled air) through an enclosure of the battery. The battery may define ducting or fluid channels within the enclosure to facilitate this type of thermal preconditioning. FIGS. 5-8B illustrate example configurations of batteries that include ducts to facilitate thermal preconditioning using forced air.

Thermally preconditioning the battery may occur simultaneously with or overlap charging of the battery. In some cases, the battery is maintained at a target charging temperature, during charging, using the same thermal management apparatuses that are then subsequently used for thermally preconditioning the battery to the target initial temperature.

In some cases, the UAS may select a particular battery for use in a given mission from a set of candidate batteries after determining the target initial temperature. For example, the thermal analysis system 214 may select a battery, from the set of candidate batteries, that has an actual temperature that is closest to the target initial temperature (or has an actual temperature that is equal to or less than a threshold temperature difference relative to the target initial temperature), and that otherwise satisfies the requirements of the mission, such as having a sufficient capacity. The selected battery may then be heated or cooled to reach the target initial temperature. By selecting a battery that is closest to the target initial temperature, the energy requirements and time required to heat or cool the battery to the target initial temperature may be minimized, thereby improving the speed and efficiency of the overall system. Reducing the time required for thermally preconditioning the battery may also reduce the time between a UAS receiving a mission request and the UAV being launched. This improvement in speed may be especially beneficial where the mission is to deliver medical or other life-saving supplies or services.

The batteries of a UAS may have different actual temperatures for various reasons. For example, the battery management system 200 may maintain batteries at different temperatures to help reduce thermal preconditioning time. Batteries may also return from missions at temperatures other than the ambient temperature at the launch site or battery storage facility. Accordingly, when those batteries are returned to the battery inventory with elevated or reduced temperatures, they may be selected for another mission based on their proximity to the target initial temperature for that mission.

After thermally preconditioning the battery to the target initial temperature, the battery is installed in a fuselage of a UAV (operation 308). This may include a human operator physically placing the thermally preconditioned battery in a battery cavity of a UAV, or a robotic or mechanized system that positions the battery in the UAV. At operation 310, the UAV is launched and directed to fly along the predetermined flight path.

FIGS. 4A-4D illustrate example temperature profiles of a battery for a UAV for example mission flight paths. These profiles illustrate some example ways of determining a target initial temperature for a battery. The profiles in FIGS. 4A-4D show battery temperature (T) on the y-axis and time (t) on the x-axis. The profiles represent the battery temperature of a UAV traversing a complete flight path. The dashed-line profiles represent the predicted temperature of a battery along the flight path with no thermal preconditioning (e.g., with the battery starting at an ambient temperature of the environment of the mission), and the solid-line profiles represent the predicted temperature of the battery along the same flight path with thermal preconditioning.

Figure 4A:
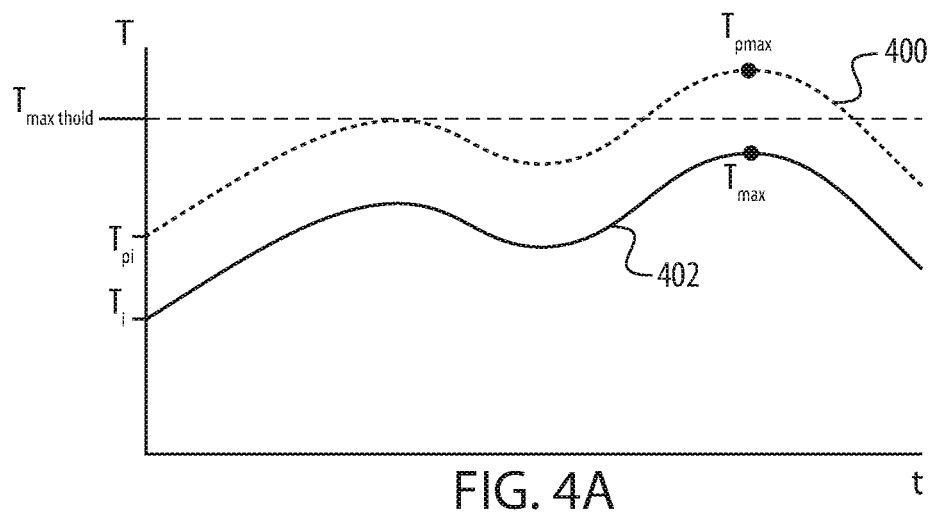
FIGS. 4A-4D depict example temperature profiles of a battery for example mission flight paths.

FIG. 4A illustrates example temperature profiles for a given mission, including a predicted temperature profile 400 (corresponding to the mission without thermal preconditioning). The profile 400 starts with the battery at an unconditioned passive initial temperature ($T_{pi}$), which may correspond to the actual or forecasted ambient temperature of the battery's environment at the starting time of the mission. Using the techniques described above, the thermal analysis system 214 (or any other suitable system) may predict the temperature of the battery at points (or continuously) along the flight path. The profile 400 has a predicted maximum temperature ($T_{pmax}$) during the path, representing the highest temperature that the battery would experience during this mission (e.g., along this particular flight path and in view of the forecasted ambient temperatures during the mission).

In some cases, it may be desirable to prevent the battery from ever exceeding a threshold maximum temperature ($T_{max\ thold}$). In particular, the batteries may degrade faster if they are used while their temperature is above a certain threshold temperature, so maintaining batteries below that temperature may help improve the useful life of the batteries. In order to prevent the battery from reaching or exceeding $T_{max\ thold}$, a target initial temperature ($T_i$) may be selected so that the temperature change of the battery along the flight path does not reach or exceed $T_{max\ thold}$. For example, as shown in FIG. 4A, $T_{max}$ of the profile 402 (representing the predicted temperature profile of the battery during the mission when starting at $T_i$ instead of $T_{pi}$) is below $T_{max\ thold}$. Once the $T_i$ is selected, the battery may be thermally preconditioned (in this case, cooled) to $T_i$ prior to the start of the mission.

The $T_{max\ thold}$ of a battery may be set at a value above which the degradation of the battery has been deemed unacceptable, and/or where operation may become dangerous to the battery or to the UAV. In some cases, the $T_{max\ thold}$ is 60° C., 50° C., 40° C., 38° C., 35° C., 30° C., 25° C. or any other suitable temperature. In some cases, the value of $T_{max\ thold}$ is based at least partially on the type of battery. For example, a lithium-ion battery may have a different $T_{max\ thold}$ than a nickel-cadmium battery, or a nickel-metal hydride battery. $T_{max\ thold}$ for any given battery may be established as a temperature at which a battery, stored at that temperature for one year at 100% charge, loses no more than 35% of its total capacity. For example, a particular battery, when stored for one year at an initial charge level of 100% and held at 40° C. for that year, may be found to lose around 35% of its total capacity. In that case, the $T_{max\ thold}$ for that battery may be established at 40° C.

Figure 4B:
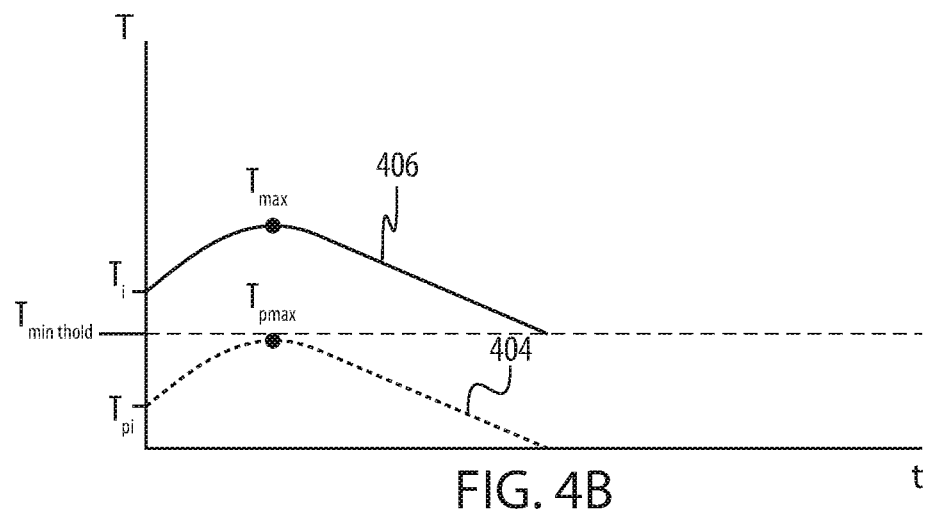

FIG. 4B illustrates temperature profiles of another example mission. This mission may have a different flight path and/or different battery, ambient temperature, and/or insulation parameters than what is represented in FIG. 4A. The predicted temperature profile 404 (representing no thermal preconditioning) may represent a mission with a flight path in a cold climate and using a UAV/battery with a high heat transfer rate to the ambient environment. Due to the low-temperature conditions, the profile 404 is entirely at or below a threshold minimum temperature ($T_{min\ thold}$). For example, $T_{pi}$ as well as $T_{pmax}$ are at or below $T_{min\ hold}$. This may be undesirable, as the batteries may not operate as efficiently when they are below $T_{min\ thold}$. Accordingly, the thermal analysis system 214 may determine a target initial temperature $T_i$ such that the temperature of the battery during the actual mission does not fall below $T_{min}$. Profile 406 illustrates the predicted temperature profile of the battery during the mission when starting at $T_i$ instead of $T_{pi}$, showing that the predicted actual temperature of the battery after thermal preconditioning is always above $T_{min}$. In this case, thermal preconditioning the battery may include heating the battery to $T_i$ prior to the start of the mission.

Figure 4C:
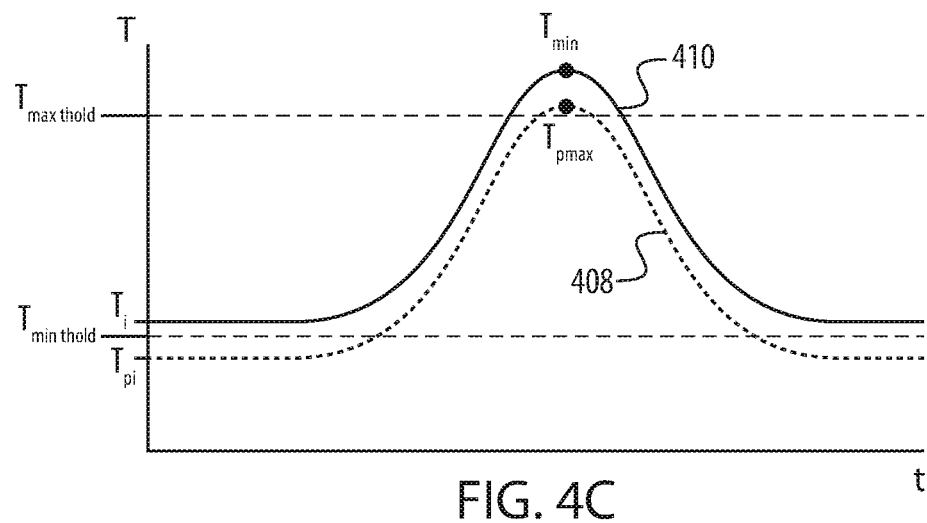

FIG. 4C illustrates temperature profiles of another example mission. In this example, the flight path results in the battery temperature having portions below $T_{min\ thold}$ and above $T_{max\ thold}$. Accordingly, the thermal analysis system 214 may determine a $T_i$ that will result in a desired temperature profile, even though the maximum or minimum thresholds may still be exceeded. For example, while exceeding $T_{max\ thold}$ may be suboptimal from a battery longevity perspective, because the profile 408 (representing no thermal preconditioning) is below $T_{min\ thold}$ for a large portion of the mission, it may be more beneficial to increase $T_i$ to maintain the battery temperature above $T_{min\ thold}$ during the mission. This may be desirable, for example, to increase the efficiency of the battery during flight, even at the expense of a short duration above $T_{max\ thold}$. Profile 410 shows the predicted temperature profile of the batter if the initial temperature is raised to $T_i$, illustrating how $T_{max}$ exceeds $T_{max\ thold}$, but the temperature profile remains above $T_{min\ thold}$ through the mission.

Figure 4D:
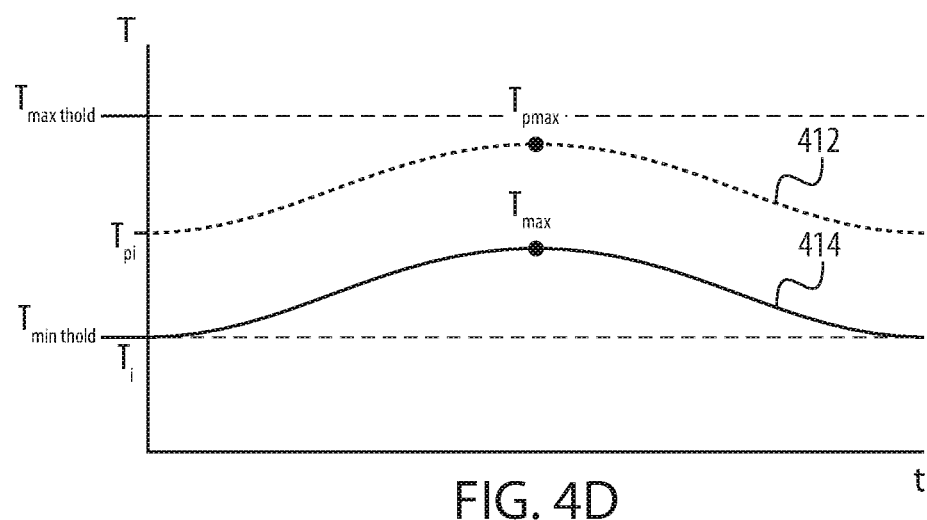

FIG. 4D illustrates temperature profiles of yet another example mission. In this example, the flight path results in maximum and minimum temperatures that are within $T_{max\ thold}$ and $T_{min\ thold}$, even when the predicted initial temperature without thermal preconditioning $T_{pi}$ is not altered. However, even where neither temperature threshold is exceeded, there may be benefits to thermally preconditioning the battery. For example, it may be beneficial to keep the maximum battery temperature as far from $T_{max\ thold}$ as possible without going below $T_{min\ thold}$. Accordingly, the thermal analysis system 214 may determine a target initial temperature $T_i$ that lowers the minimum temperature of the flight path to be at or near $T_{min\ thold}$, thus keeping the maximum temperature to a lowest possible value (without exceeding $T_{min\ thold}$). The temperature profile 414 illustrates the predicted temperature profile if the battery is cooled to $T_i$ prior to the start of the mission.

FIGS. 4A-4D show some example ways in which the target initial temperature may differ from the ambient temperature (e.g., the initial temperature the batteries would have if they were not thermally preconditioned). However, these are merely some examples, and other temperature targets and/or rule sets (and/or combinations of targets and/or rule sets) may be used to determine target initial temperatures. For example, the thermal analysis system 214 may be configured to determine a target initial temperature that minimizes the amount of time that a profile spends above $T_{max\ thold}$ or below $T_{max\ thold}$. As another example, the thermal analysis system 214 may be configured to determine a target initial temperature that maintains the average temperature of the battery during the mission at or near a target temperature (e.g., 20° C., 25° C., 27° C.). As another example, the thermal analysis system 214 may be configured to determine a target initial temperature that maintains the battery temperature within a temperature window (e.g., between 22° C. and 27° C., between 20° C. and 30° C., or any other suitable window) for as much of the mission as possible. Other targets, rule sets, and/or selection algorithms for determining the target initial temperature may also be used.

Figure 5:
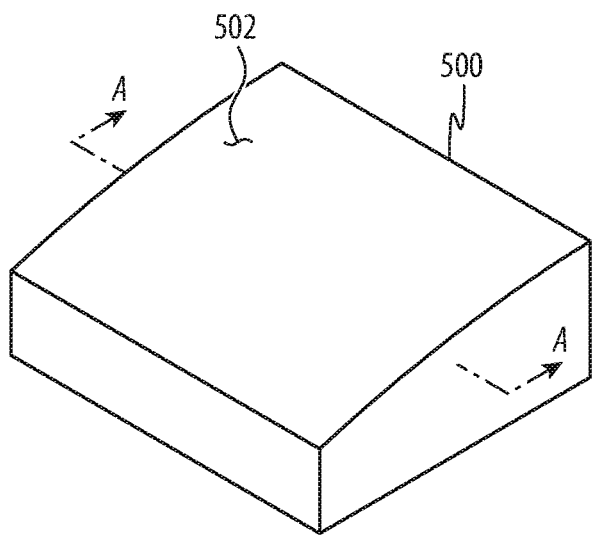
FIG. 5 depicts an example battery for a UAV.

FIG. 5 illustrates an example battery 500 that may be used to provide power to a UAV (e.g., the UAV 100, FIG. 1), or any other suitable vehicle. The battery 500 may be an embodiment of the battery 110 in FIG. 1.

In some implementations, the battery 500 (or a housing of the battery 500) defines a surface 502 that defines an external surface of the fuselage when the battery 500 is installed in the vehicle. (FIG. 1 further illustrates a battery defining an exterior fuselage surface.). The surface 502 may act as a heat-transfer surface between the battery and an external environment. In other implementations, the battery 500 is configured to be installed in a compartment within a vehicle, such that none of the battery's surfaces define an exterior fuselage surface. In some cases, the battery and/or the compartment for the battery include insulation to prevent or limit heat transfer between the battery and the exterior environment. As described herein, the battery 500 may include an air duct within the battery 500 that allows air to be passed through the battery 500 to thermally condition the battery.

Figure 6A:
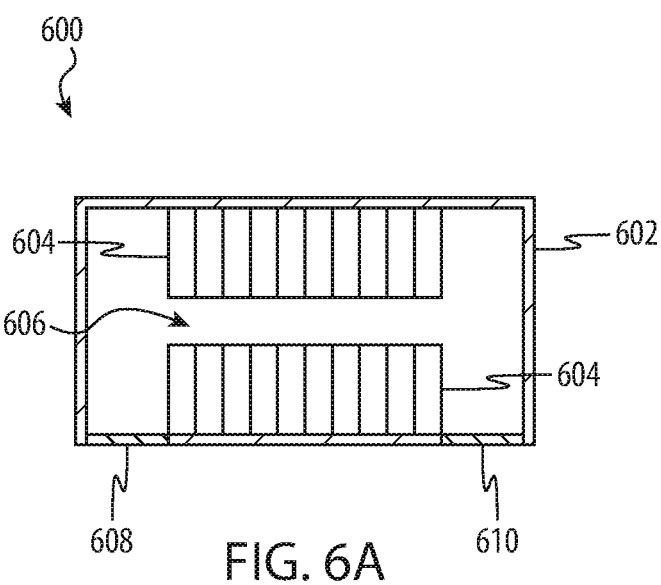
FIGS. 6A-6B depict a partial cross-sectional view of an example battery for a UAV.

FIG. 6A illustrates a partial cross-sectional view of the battery 500, viewed along line A-A in FIG. 5. The battery 500 may include an enclosure 602 and a plurality of cells 604 housed within the enclosure 602. The battery 500 may also include other components, such as battery control circuitry, heating elements, cooling elements, electrical and/or mechanical components (e.g., for electrically and/or mechanically coupling the battery 500 to a UAV or other vehicle), and the like.

The battery 500 may define an air duct 606 that is in thermal communication with the cells 604. The air duct 606 may allow air to pass through the air duct to thermally condition the battery 500 by heating and/or cooling the cells 604. In some cases, the air duct may allow air to pass over surfaces of the cells 604 themselves. In other cases, the cells may be at least partially encapsulated or held in a matrix material, which may mechanically hold the cells 604 in a particular orientation and/or position, and may optionally act as a thermal regulator for the cells 604. For example, the matrix material may be considered to absorb heat from the cells 604, such as by using heat from the cells 604 to cause a phase change in the matrix material. In any case, the air duct 606 is configured to facilitate heat transfer between the cells 604 and air within the air duct 606.

Figure 6B:
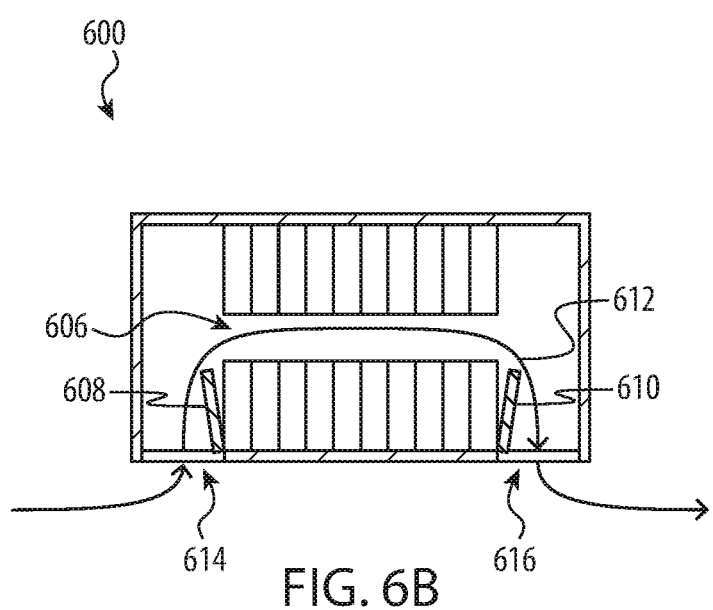

The air duct 606 may define an inlet 614 (FIG. 6B) and an outlet 616 (FIG. 6B), and the battery 500 may further include movable doors 608, 610 that are configured to selectively open and close to provide access to the air duct 606. FIG. 6A shows the battery 500 with the movable doors 608, 610 in a closed position, while FIG. 6B shows the battery 500 with the movable doors 608, 610 in an open position. When the movable doors 608, 610 are in the open position, a stream of air 612 (or any other suitable fluid) may be passed through the air duct 606 to thermally condition the battery 500 (e.g., heat or cool the battery). Where a stream of air is used to thermally condition a battery, the air may be treated prior to being passed through the air duct. Treating the air may include performing any suitable process on the air so that it can be used to heat and/or cool the battery. For example, treating the air may include heating, cooling, dehumidifying, humidifying, compressing, or any other suitable process or treatment. The air may be heated or cooled using any suitable technique, including without limitation vapor compression refrigeration cycles, evaporative coolers, electric heaters, or gas (or other fuel) heaters. In some cases, instead of air, another type of gas or fluid may be used, such as nitrogen, carbon dioxide, water, oil, or the like.

The movable doors 608, 610 may be configured to be closed while the battery 500 is installed in a UAV, when it is not coupled to a thermal management apparatus (e.g., the rack charger 220), and/or is otherwise not being thermally conditioned. On the other hand, the movable doors 608, 610 may be configured to be open when they are coupled to a thermal management apparatus and/or are being thermally conditioned. In some cases, the movable doors 608, 610 may also be opened or openable when the battery 500 is installed in a vehicle, such as to allow the battery to be heated and/or cooled during use.

The movable doors 608, 610 may be actuated to be opened or closed in any suitable way. In some cases, the movable doors 608, 610 are opened and/or closed by a physical interaction between the battery 500 and a thermal management apparatus, by an electromagnetic actuator (or other type of actuator) integrated with the battery 500, or by other suitable mechanisms and/or techniques. In some cases, the battery 500 does not include movable doors, but instead includes openings without doors, flaps, or other movable covers. Examples of these types of configurations are described herein.

Figure 7A:
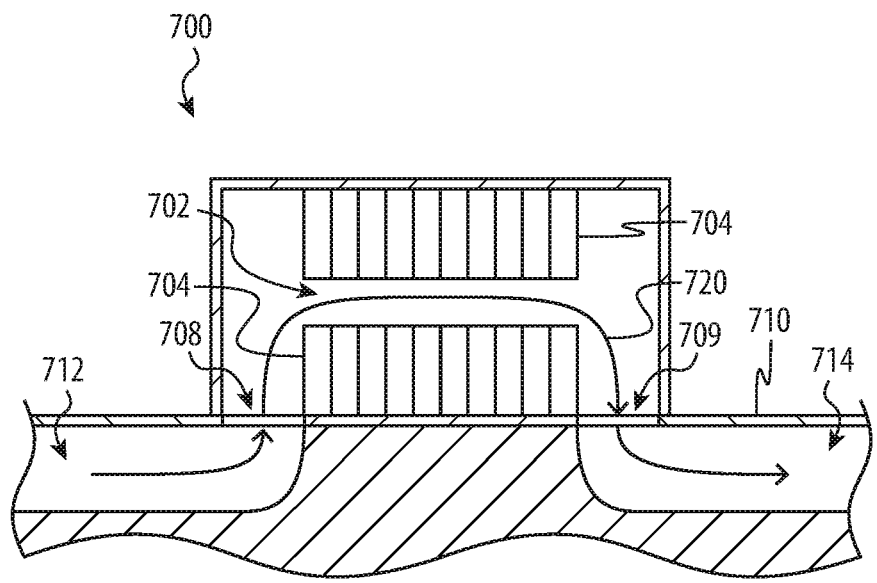
FIG. 7A is a partial cross-sectional view of an example battery for a UAV coupled with a thermal management apparatus.

FIG. 7A illustrates a partial cross-sectional view of another example battery 700, which may be an embodiment of the battery 110 (FIG. 1) and/or the battery 500 (FIG. 5A), with the battery 700 positioned on a thermal management apparatus 710. The battery 700 includes a plurality of cells 704 and defines an air duct 702 in thermal communication with the cells 704. The air duct 702 may define or be in communication with an inlet 708 and an outlet 709. The battery 700 may lack doors, flaps, covers, or other components that seal or otherwise cover the inlet and outlet 708, 709.

When the battery 700 is coupled to a thermal management apparatus 710 (which may be an embodiment of a rack charger 220, for example), air ducts 712, 714 may fluidly couple to the inlet and outlet 708, 709 of the battery 700, thereby allowing a stream of air or other fluid 720 to pass through the air duct 702 of the battery and heat and/or cool the cells 704.

Figure 7B:
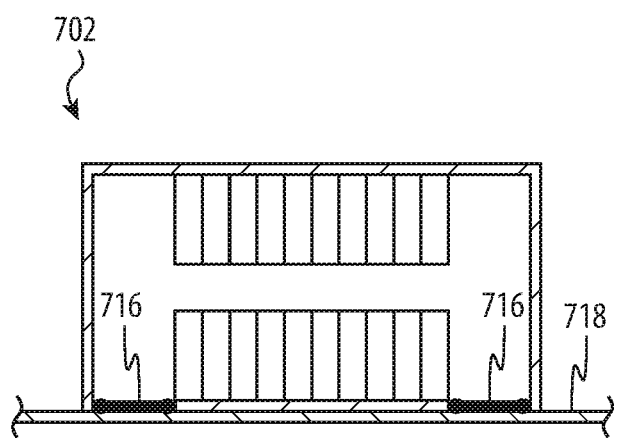
FIG. 7B is a partial cross-sectional view of the battery of FIG. 7A coupled with a UAV.

As the battery 700 does not include movable doors, flaps, or other components to selectively open and close the inlet and outlet 708, 709, the UAV may include sealing members that seal the inlet and outlet 708, 709 closed while the battery 700 is in the UAV. FIG. 7B shows the battery 700 positioned in a UAV. The UAV may include a battery support member 718, which may define a portion of a battery cavity or chamber of the UAV. The UAV may also include cover members 716, which may engage the battery 700 to cover and/or block the inlet and outlet 708, 709. In some cases, the cover members 716 include compliant seals such as an elastomer, foam, o-ring, or other component that forms an intimate seal against the battery 700 to prevent and/or limit air, moisture, liquids, or other fluids and/or contaminants from entering the battery 700. In other cases, the cover members 716 may lack compliant seals, and may simply occlude, cover, or otherwise block the inlet and outlet 708, 709.

Figure 8A:
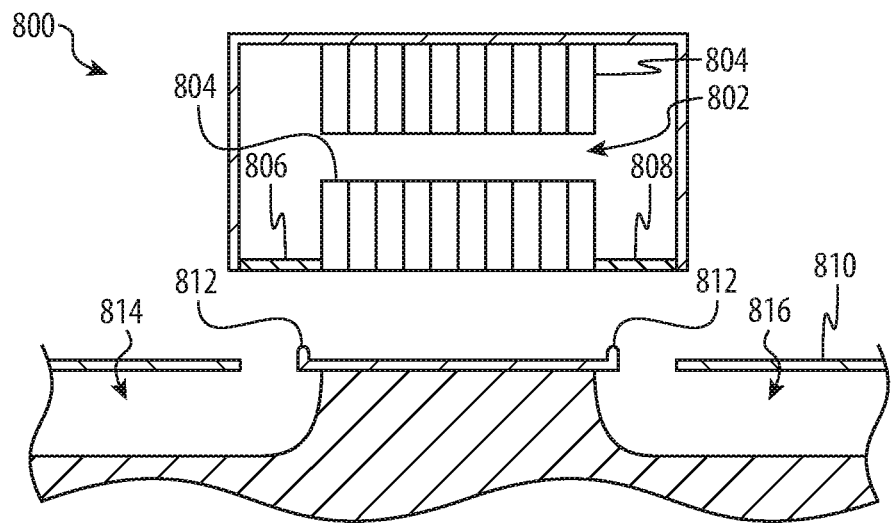
FIG. 8A is a partial cross-sectional view of an example battery for a UAV prior to being coupled with a thermal management apparatus.
Figure 8B:
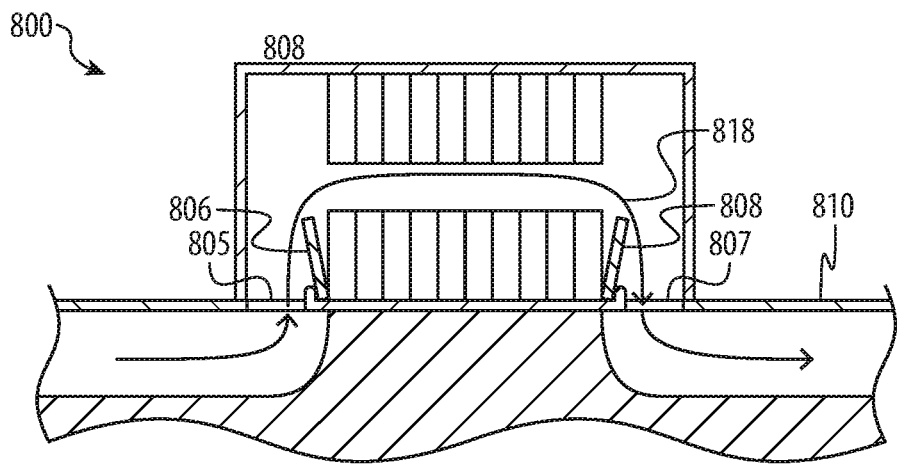
FIG. 8B is a partial cross-sectional view of the battery of FIG. 8A coupled with a thermal management apparatus.

FIG. 8A illustrates a partial cross-sectional view of another example battery 800, which may be an embodiment of the battery 110 (FIG. 1) and/or the battery 500 (FIG. 5A), with the battery 800 positioned over a thermal management apparatus 810. The battery 800 includes a plurality of battery cells 804, and defines an air duct 802 in thermal communication with the cells 804. The air duct 802 may define or be in communication with an inlet 805 and an outlet 807 (FIG. 8B). The battery 800 may include doors 806, 808 that cover the inlet and outlet 805, 807, and are openable to allow air to flow into the battery through the air duct 802. The doors 806, 808 may be mechanically biased in a closed position, as shown in FIG. 8A. For example, the doors 806, 808 may be biased closed with springs, elastomers, living hinges, or any other suitable mechanism and/or material.

The doors 806, 808 may be mechanically opened when the battery 800 is engaged with another component such as a thermal management apparatus 810 (which may be an embodiment of the rack charger 220). For example, as shown in FIG. 8A, a thermal management apparatus 810 may include door actuating members 812 that engage the doors 806, 808 and move them from a closed position to an open position when the battery 800 is placed on and/or engaged with the thermal management apparatus 810. Once placed on the thermal management apparatus, the doors 806, 808 are opened so that air can pass through the supply duct 814, through the air duct 802 of the battery, and out the exhaust duct 816. FIG. 8B shows the battery 800 engaged with the thermal management apparatus 810 such that the door actuating members 812 have engaged the doors 806, 808 and forced them into an open configuration such that a stream of air 818 may pass through the air duct 802 and thermally condition the cells 804.

Figure 8C:
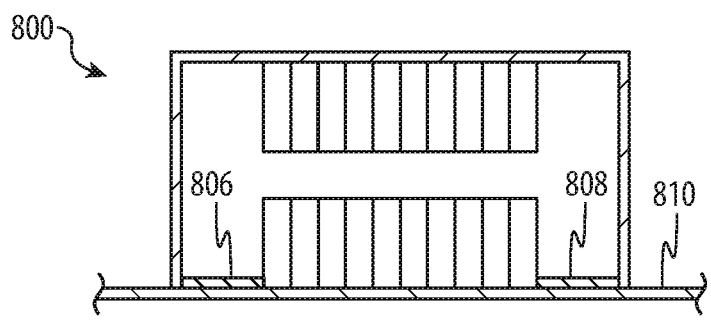
FIG. 8C is a partial cross-sectional view of the battery of FIG. 8A coupled with a UAV.

FIG. 8C shows the battery 800 installed in a UAV or other suitable vehicle. As noted above, the doors 806, 808 may be biased in a closed position such that when the battery 800 is installed in a UAV or other vehicle, the doors 806, 808 are closed without requiring any dedicated components or systems in the UAV. In other cases, the doors 806, 808 may be forced into a closed position by door closure features or mechanisms of the UAV, where the door closure features or mechanisms are configured to force the doors closed when the battery is coupled to the unmanned aerial vehicle (either via direct engagement with the doors or via a linkage or other mechanism). In some cases, the doors 806, 808 are forced into an open or partially open position by the UAV, for example, to allow air to pass through the air duct 802 during flight operations.

While FIGS. 8A-8C illustrate simple door actuating members 812 that directly force the doors 806, 808 open, other types of mechanisms may also be used. For example, the battery 800 may include linkages, cams, gears, or other mechanisms that are operative to open and/or close the doors 806, 808 when the battery 800 is installed in or otherwise used with various different components. For example, the battery 800 may include actuation tabs or levers with which a thermal management apparatus (e.g., the rack charger 220) may engage to open and/or close the doors 806, 808. Accordingly, the doors 806, 808 may be opened and/or closed without direct contact between the doors and the thermal management apparatus. In cases where a UAV or other vehicle selectively opens and/or closes the doors during a mission, the vehicle may use the same actuation tabs or levers to control the position of the doors.

In some cases, thermal conditioning of a battery may be performed during flight. In some cases, the battery and/or the UAV may include heating and/or components (e.g., Peltier devices, heating coils, heat exchangers, etc.) that can be controlled by the UAV and/or the battery to change, modify, maintain, or otherwise control the temperature of the battery.

Figure 9:
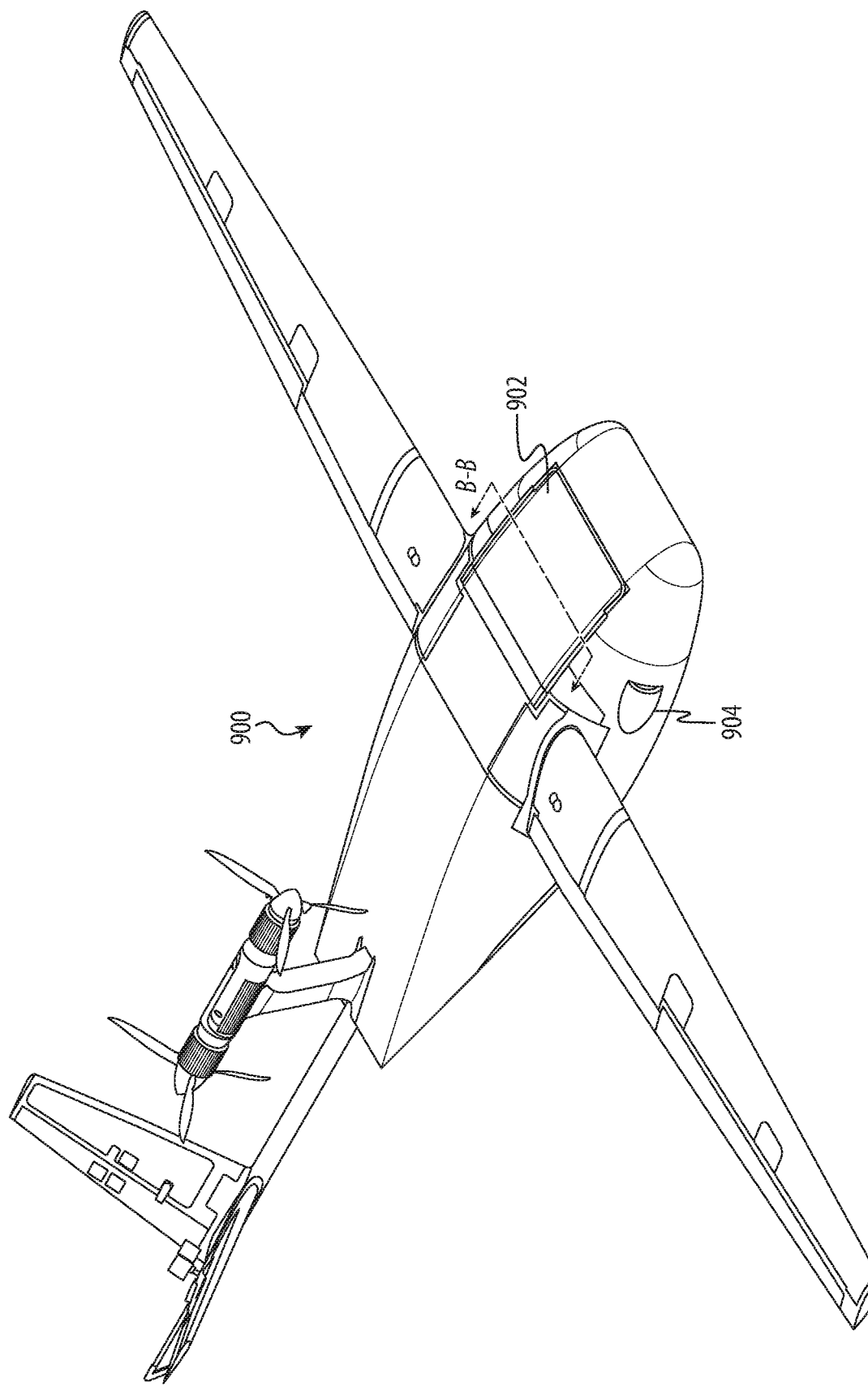
FIG. 9 depicts another example UAV.

In some cases, the battery and UAV may leverage the air duct in a battery to facilitate thermal management of the battery while in flight. FIG. 9 illustrates an example UAV 900 (which may be an embodiment of the UAV 100, FIG. 1) with a battery 902 attached. The battery 902 may be an embodiment of any of the batteries described herein. The UAV 900 may include an air intake 904 (and optionally an exhaust) that is configured to direct air from outside the UAV into the battery 902 to heat and/or cool the battery 902 during flight. In particular, some of the air flowing along the fuselage of the UAV 900 during flight may be forced into or otherwise captured by the intake 904 and directed into, over, or along the battery 902, or otherwise used to thermally condition the battery 902.

In some cases, the UAV 900 includes sensors to determine the air temperature of the outside air during flight and to determine the temperature of the battery during flight. The UAV 900 may also be configured to determine whether the outside air can and should be used to heat and/or cool the battery 902 during flight. In some cases, the UAV 900 monitors the temperature of the battery 902 during flight to determine if thermal conditioning of the battery is warranted. Thermal conditioning may be warranted if the battery temperature has reached or approaches a threshold temperature. In some cases, the UAV 900 may attempt to maintain the battery 902 at a desired target temperature (e.g., 25° C., or any other suitable temperature). If the battery 902 is above that temperature and if the air temperature outside the UAV is capable of cooling the battery, the UAV 900 may use air flow from the intake 904 to cool the battery 902. If the air temperature is not capable of cooling the battery (e.g., because the air is too hot), the UAV 900 may determine not to use air flow from the intake 904, as doing so would be counterproductive. In such cases, the UAV 900 may take no action or may use other techniques to cool the battery 902. A similar technique may be used to determine whether to heat the battery (e.g., if the battery 902 is below the target temperature and the air temperature is above the target temperature, the UAV 900 may use air from the intake 904 to heat the battery 902).

The ability of the UAV 900 to actively thermally condition the battery 902 using external air flow may be accounted for in the battery preconditioning techniques described herein. For example, when the target initial temperature for a battery is determined, the determination may account for the predicted ambient air temperature during the flight, along with the ability of the UAV to use that air to cool or heat the battery. Thus, for example, if the flight path includes a segment requiring high battery output (and thus a temperature spike for the battery), a low target initial temperature may be selected so that the temperature spike does not exceed a threshold value. If that segment occurs where the air temperature is predicted to be cold, and if the UAV can harness that cold air to actively cool the battery, the initial-temperature selection algorithm may account for the predicted ambient temperature (and the UAV's effectiveness in using that air for cooling) and determine a higher target initial temperature. That is, because the UAV would be able to cool the battery during that segment, the battery need not be cooled as much as it might otherwise. This example further illustrates how using actual forecasted or predicted air temperatures at different locations along a flight path may be used to make highly tailored and customized determinations of target initial battery temperatures for individual missions.

Figure 10A:
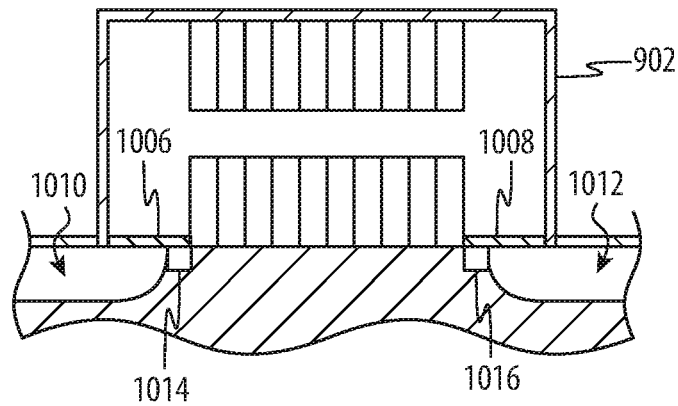
FIGS. 10A-10B are partial cross-sectional views of the UAV of FIG. 9.

FIG. 10A is a partial cross-sectional view of the UAV 900 and the battery 902, viewed along line B-B in FIG. 9. The battery 902 is positioned on an interior portion of the fuselage of the UAV 900, such as in a battery cavity. The UAV 900 includes a supply duct 1010 (which may be in fluid communication with the intake 904) and an exhaust duct 1012 (which may be in fluid communication with an exhaust or fluid outlet that vents to the ambient environment of the UAV 900). The battery 902 may be an embodiment of the battery 800, and in particular may include doors 1006, 1008 that are similar in structure and/or function to the doors 806, 808 in FIGS. 8A-8C. In particular, the doors 1006, 1008 may be biased in a closed position by a spring or other suitable biasing member.

The UAV 900 may also include door actuators 1014, 1016 that are configured to selectively open and/or close the doors 1006, 1008. The door actuators 1014, 1016 may be any suitable actuators or other components that can apply a force to the doors 1006, 1008 or to another component of the battery 902 to cause the doors to selectively open and/or close. In some cases, the door actuators 1014, 1016 are or include solenoids, pneumatic actuators, linear motors, rotary motors, lead screws, servos, magnets, electromagnets, or the like.

Figure 10B:
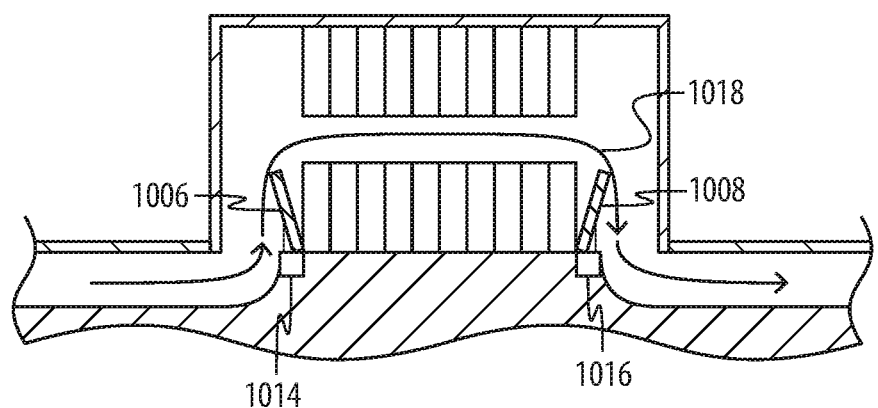

The door actuators 1014, 1016 may be controlled by the UAV 900 to facilitate thermal conditioning of the battery 902 during flight. For example, when the UAV 900 determines that a condition for thermal conditioning of the battery is satisfied (e.g., when the battery should be cooled and the external air is suitable for cooling), the UAV 900 may cause the door actuators 1014, 1016 to open the doors 1006, 1008, as shown in FIG. 10B, thereby allowing a stream of air 1018 to be directed from the supply duct 1010, through the air duct of the battery 902, and out the exhaust duct 1012. When thermal conditioning is not required and/or not possible due to the target battery temperature and/or the ambient air temperature, the door actuators 1014, 1016 may be operative to close the doors 1006, 1008, as shown in FIG. 10A.

The air that is directed through the battery 902 may be directed into the supply duct 1010 from the air intake 904 (FIG. 9), and may be exhausted from the UAV 900 at any suitable location. In some cases, the intake 904 and any exhaust port or vent may be positioned at any suitable location on the UAV 900 and may have any suitable shape, size, and/or configuration. For example, the intake 904 and any exhaust ports or vents may be configured so as to reduce or limit negative aerodynamic impact on the UAV 900. Also, the UAV 900 may include intake and/or exhaust vent doors, flaps, or other components or systems that can be used to selectively open and/or close the air intake and/or exhaust ports or vents. For example, the UAV 900 may include a retractable intake scoop (or other selectively openable and closeable component) that can be selectively closed when thermal conditioning operations are not active in order to reduce aerodynamic drag, and selectively opened when thermal conditioning operations are active. Similarly, the UAV 900 may include a retractable (or otherwise selectively openable and closable) exhaust port or vent that can be opened when thermal conditioning operations are active and closed when they are inactive.

In the examples of FIGS. 5-10B, air is shown as flowing in one direction through a battery. However, air may be flowed through the battery in the opposite direction, and/or may be flowed through the battery in alternating directions. Alternating the direction of air flow may help improve thermal conditioning efficiency and/or speed. Further, alternating the direction of air flow may help maintain a more constant temperature throughout the battery (e.g., reducing temperature gradients in the battery along the direction of the air flow).

Further, while these examples thermally condition the battery by flowing air through a duct in the battery, other types of thermal conditioning may also be used, such as liquid heating/cooling, cooling and/or heating plates in contact with a heat-transfer surface of the battery, ovens, electric blankets, external convection (e.g., blowing hot and/or cold air over an exterior heat-transfer surface), and the like. In the case of liquid heating and/or cooling, the battery may include a liquid conduit that carries liquid through the battery to thermally condition the cells. A liquid heating and/or cooling system may be an open system, where liquid is introduced into an inlet and ejected via an outlet, or a closed system where the liquid is sealed within the battery and is heated and/or cooled via heat exchangers, radiators, or the like.

The foregoing description, for purposes of explanation, used specific nomenclature to provide a thorough understanding of the described embodiments. However, it will be apparent to one skilled in the art that the specific details are not required in order to practice the described embodiments.

Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above and below, or their synonyms, do not necessarily refer to an absolute position relative to an external reference, but instead refer to the relative position of components with reference to the figures.

What is claimed is:

1. A method of preconditioning a battery for use in an unmanned aerial vehicle, comprising:
   fluidly coupling a fluid channel of a thermal management apparatus to an opening in fluid communication with the battery;
   determining a predicted temperature change of the battery as a result of the unmanned aerial vehicle traversing a predetermined flight path;
   determining a target initial temperature for the battery, wherein the target initial temperature is based at least in part on the predicted temperature change and configured to operate the battery within a preferred temperature range during traversal of the predetermined flight path;
   selectively actuating a covering of the opening to allow air from the fluid channel of the thermal management apparatus to the battery; and
   at least one of heating or cooling the battery to the target initial temperature by directing air to the battery.

2. The method of claim 1, wherein the opening is defined in part by an air duct extending from the battery to an external surface of the unmanned aerial vehicle, the air duct defined in part by a feature of a fuselage of the unmanned aerial vehicle.

3. The method of claim 2, wherein the air duct allows the air to pass over a plurality of cells of the battery.

4. The method of claim 2, further comprising:
   launching the unmanned aerial vehicle after the battery is heated or cooled to the target initial temperature; and
   actuating the covering to direct air to the battery to selectively heat or cool the battery during traversal of the predetermined flight path.

5. The method of claim 1, wherein:
   the battery comprises:
     an enclosure housing a plurality of cells of the battery, and
     an air duct defined in part by the enclosure and extending from the opening to the plurality of cells; and
   the operation of thermally conditioning the battery comprises passing a stream of conditioned air through the air duct.

6. The method of claim 1, wherein the covering is one or more doors.

7. The method of claim 1, wherein the predicted temperature change is at least partially based on one or more of a weather condition of at least a portion of the predetermined flight path, a thermal condition of at least a portion of the predetermined flight path, a distance of the predetermined flight path, a condition of the battery, an energy requirement to traverse the predetermined flight path, or a power requirement to traverse a portion of the predetermined flight path.

8. The method of claim 1, further comprising:
   prior to heating or cooling the battery to the determined target initial temperature:
     charging the battery; and
     while charging the battery, performing at least one of heating or cooling the battery to the target initial temperature.

9. The method of claim 1, further comprising:
   launching the unmanned aerial vehicle when the battery reaches the target initial temperature.

10. A method of conditioning a battery for use in an unmanned aerial vehicle, comprising:
    determining a target battery temperature for the battery of the unmanned aerial vehicle based on flight conditions for a planned flight path of the unmanned aerial vehicle, wherein the target battery temperature is configured to limit a duration that the battery operates above or below a threshold temperature during traversal of the planned flight path;
    fluidly coupling a channel of the thermal management apparatus to an opening in fluid communication with one or more cells of the battery to perform at least one of heating or cooling the battery to the target charging temperature;
    at least one of heating or cooling the battery to the target battery temperature, wherein:
      the heating or cooling is based on a predicted temperature change of the battery as a result of the unmanned aerial vehicle traversing the planned flight path, and
      wherein the operation of at least one of heating or cooling the battery comprises passing a stream of air from the channel to the battery; and
    clearing the unmanned aerial vehicle for launch when the battery is at the target battery temperature.

11. The method of claim 10, further comprising:
    determining a target charge specification for the battery, the target charge specification including an energy or power requirement to traverse the predetermined flight path;
    charging the battery, wherein the thermal management apparatus is operatively associated with a battery charging system; and
    wherein the target battery temperature is based in part on the target charge specification or a temperature change of the battery due to charging.

12. The method of claim 10, wherein the target battery temperature is based in part on a current temperature of the battery.

13. The method of claim 12, wherein:
    the opening is defined by a portion of an external surface of the unmanned aerial vehicle;
    a cover selectively provides access to the opening; and
    the cover is in fluid communication with the air duct of the thermal management apparatus during the heating or cooling of the battery.

14. The method of claim 12, wherein the stream of air passes directly over the one or more cells of the battery.

15. A method of preconditioning a battery for use in an unmanned aerial vehicle, comprising:
    fluidly coupling a fluid channel of a thermal management apparatus to an opening in fluid communication with the battery, wherein the opening is defined in part by an air duct extending from the battery to an external surface of the unmanned aerial vehicle, the air duct defined in part by a feature of a fuselage of the unmanned aerial vehicle;
    determining a predicted temperature change of the battery as a result of the unmanned aerial vehicle traversing a predetermined flight path;

determining a target initial temperature for the battery, wherein the target initial temperature is based at least in part on the predicted temperature change and configured to operate the battery within a preferred temperature range during traversal of the predetermined flight path;

selectively actuating a covering of the opening to allow air from the fluid channel of the thermal management apparatus to the battery; and at least one of heating or cooling the battery to the target initial temperature by directing air to the battery.

* * * * *